United States Patent
Luciani et al.

(10) Patent No.: US 9,755,419 B2
(45) Date of Patent: Sep. 5, 2017

(54) SYSTEMS AND METHODS FOR DETECTING AND DETERMINING SOURCES OF POWER DISTURBANCES IN CONNECTION WITH EFFECTIVE REMEDIATION

(71) Applicant: Innovolt, Inc., Atlanta, GA (US)

(72) Inventors: Vincent P. Luciani, Charlotte, NC (US); Eugene Bright, Boca Raton, FL (US)

(73) Assignee: INNOVOLT, INC., Atlanta, GA (US)

( * ) Notice: Subject to any disclaimer, the term of this patent is extended or adjusted under 35 U.S.C. 154(b) by 674 days.

(21) Appl. No.: 14/213,838

(22) Filed: Mar. 14, 2014

(65) Prior Publication Data
US 2014/0268458 A1    Sep. 18, 2014

Related U.S. Application Data

(60) Provisional application No. 61/783,567, filed on Mar. 14, 2013.

(51) Int. Cl.
H02H 3/00    (2006.01)
H02H 3/10    (2006.01)
H02H 1/04    (2006.01)

(52) U.S. Cl.
CPC .............. *H02H 3/10* (2013.01); *H02H 1/043* (2013.01)

(58) Field of Classification Search
CPC ....................................................... H02H 3/10
USPC .......................................................... 361/86
See application file for complete search history.

(56) References Cited

U.S. PATENT DOCUMENTS

| | | | |
|---|---|---|---|
| 5,010,293 A | 4/1991 | Ellersick | |
| 5,990,581 A | 11/1999 | Ikegami et al. | |
| 7,099,135 B2 * | 8/2006 | Ball | H02H 9/001 361/58 |
| 2004/0090726 A1 | 5/2004 | Ball | |
| 2008/0247105 A1 | 10/2008 | Divan | |
| 2012/0063043 A1 | 3/2012 | Divan | |

(Continued)

FOREIGN PATENT DOCUMENTS

DE        4331250 C1        9/1994

OTHER PUBLICATIONS

International Search Report and Written Opinion mailed Sep. 12, 2014 for related PCT Application No. PCT/US2014/029312.

*Primary Examiner* — Stephen W Jackson
(74) *Attorney, Agent, or Firm* — Morris, Manning & Martin, LLP.; John R. Harris

(57) ABSTRACT

Apparatus and methods for selective protection of an electrical load from disturbances on an input power line. A power protection circuit includes a selectively variable inrush current limiting circuit and a switch for disconnecting the input power line from the load. A control circuit determines that the electrical load is in a first operational state, such as a standby mode or normal operation, or a second operational state, such as full operation at rated current. The power protection circuit provides variable inrush current limiting to the electrical load in response to a first category of disturbances when the electrical load is in the first operational state. The power protection circuit inhibits disconnecting the electrical load in response to a second category of disturbances when the electrical load is in the second operational state. Species of selectively variable current limiting circuits are also described.

120 Claims, 14 Drawing Sheets

EXEMPLARY SELECTIVE CURRENT LIMITING PROTECTION CIRCUIT

(56) References Cited

U.S. PATENT DOCUMENTS

2012/0169141 A1    7/2012   Divan
2012/0221161 A1    8/2012   Billingsley et al.
2012/0262140 A1   10/2012   Divan

* cited by examiner

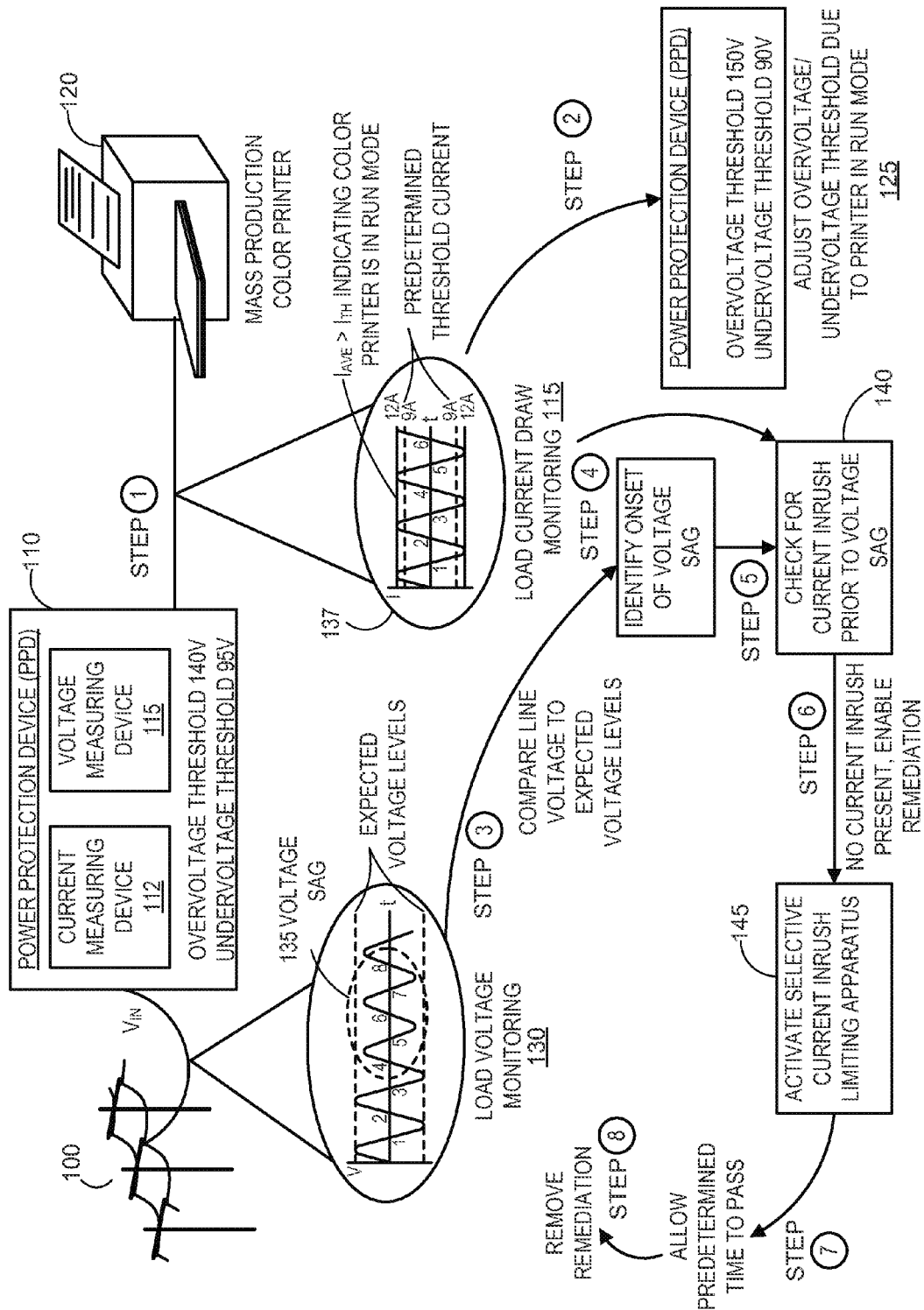
FIG. 1 – EXEMPLARY BLOCK DIAGRAM OF A POWER PROTECTION DEVICE ENVIRONMENT

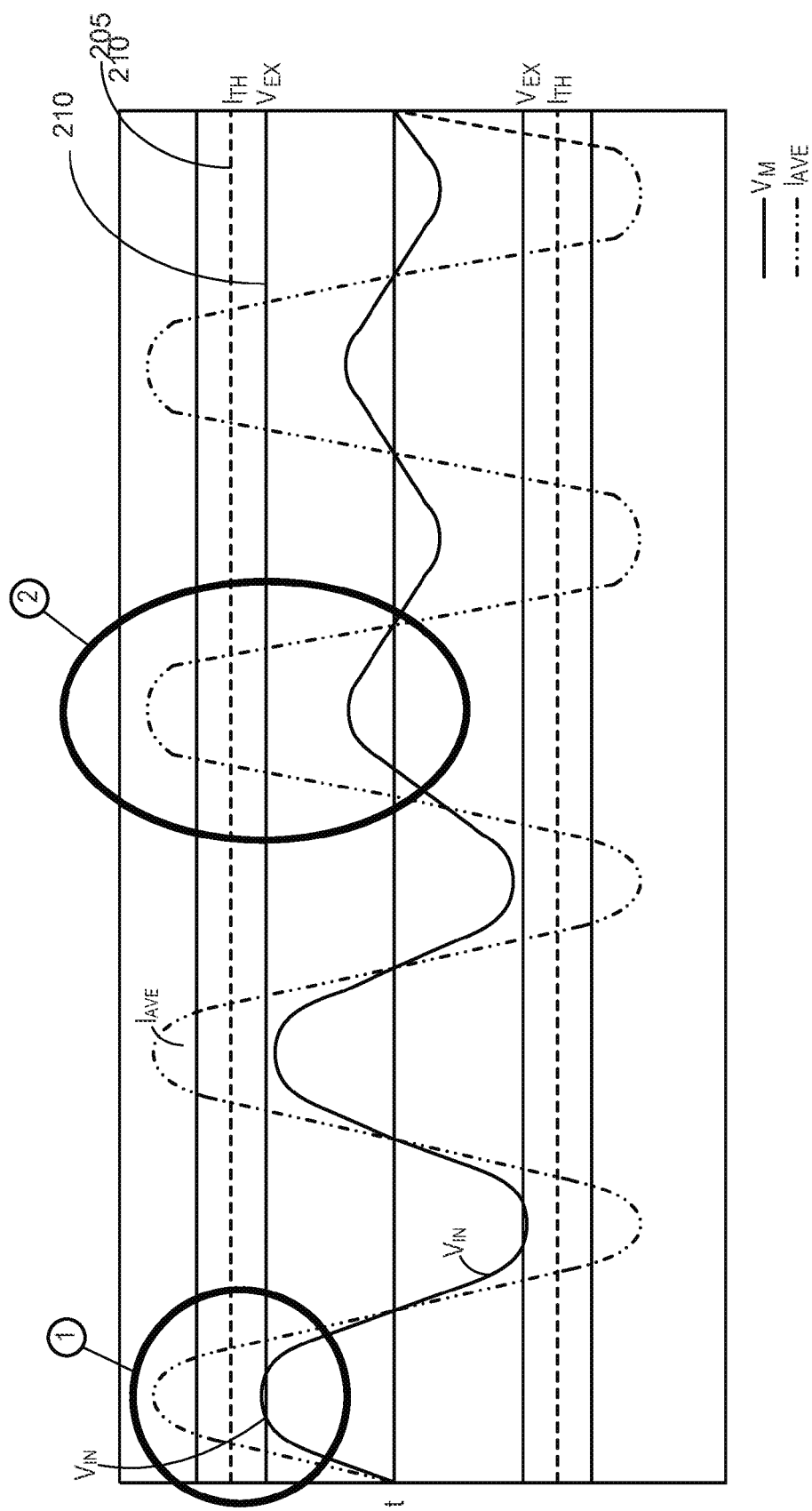
FIG. 2 – EXEMPLARY CURRENT VERSUS VOLTAGE WAVEFORM COMPARISON

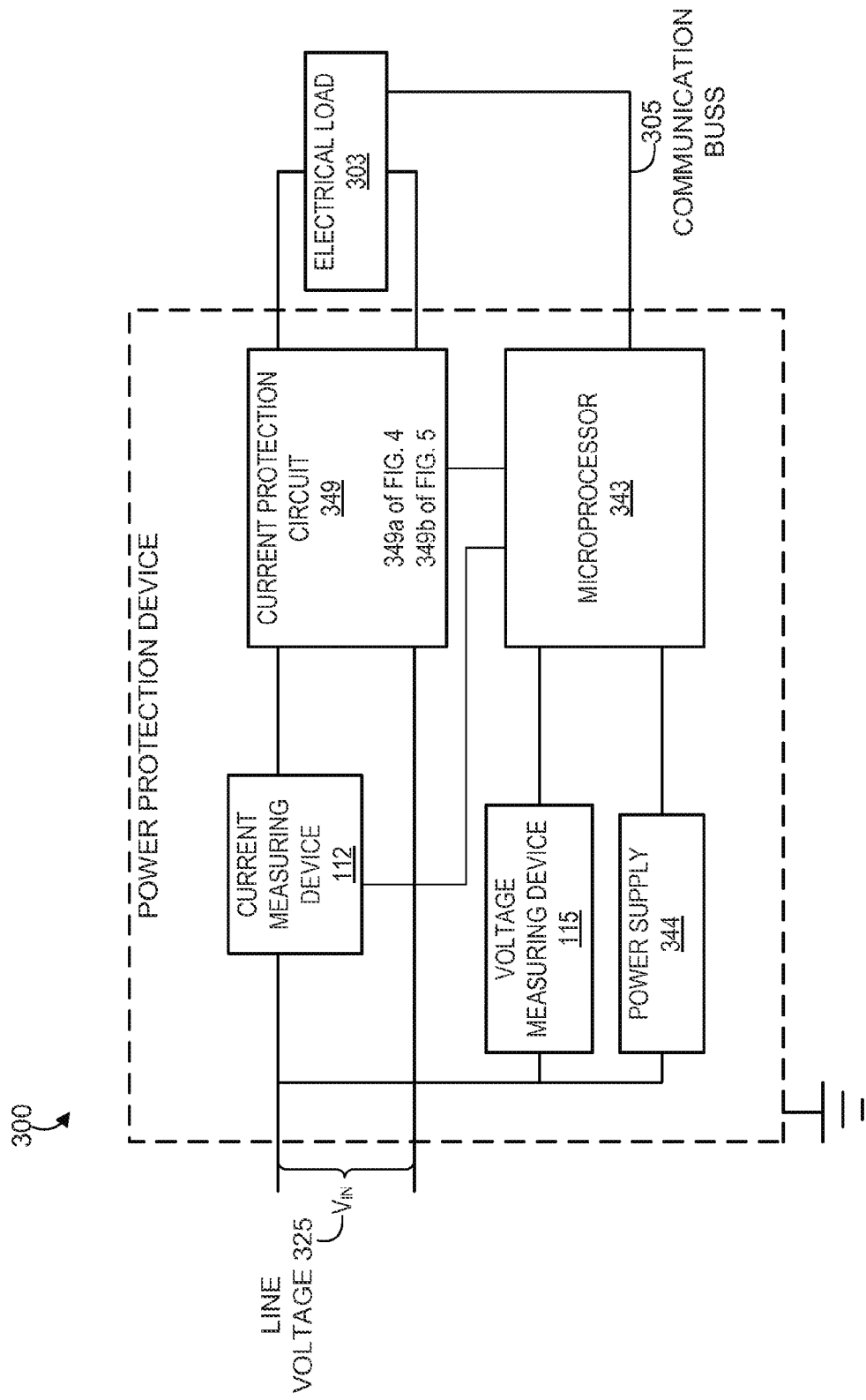
FIG. 3 – POWER PROTECTION DEVICE ARCHITECTURE

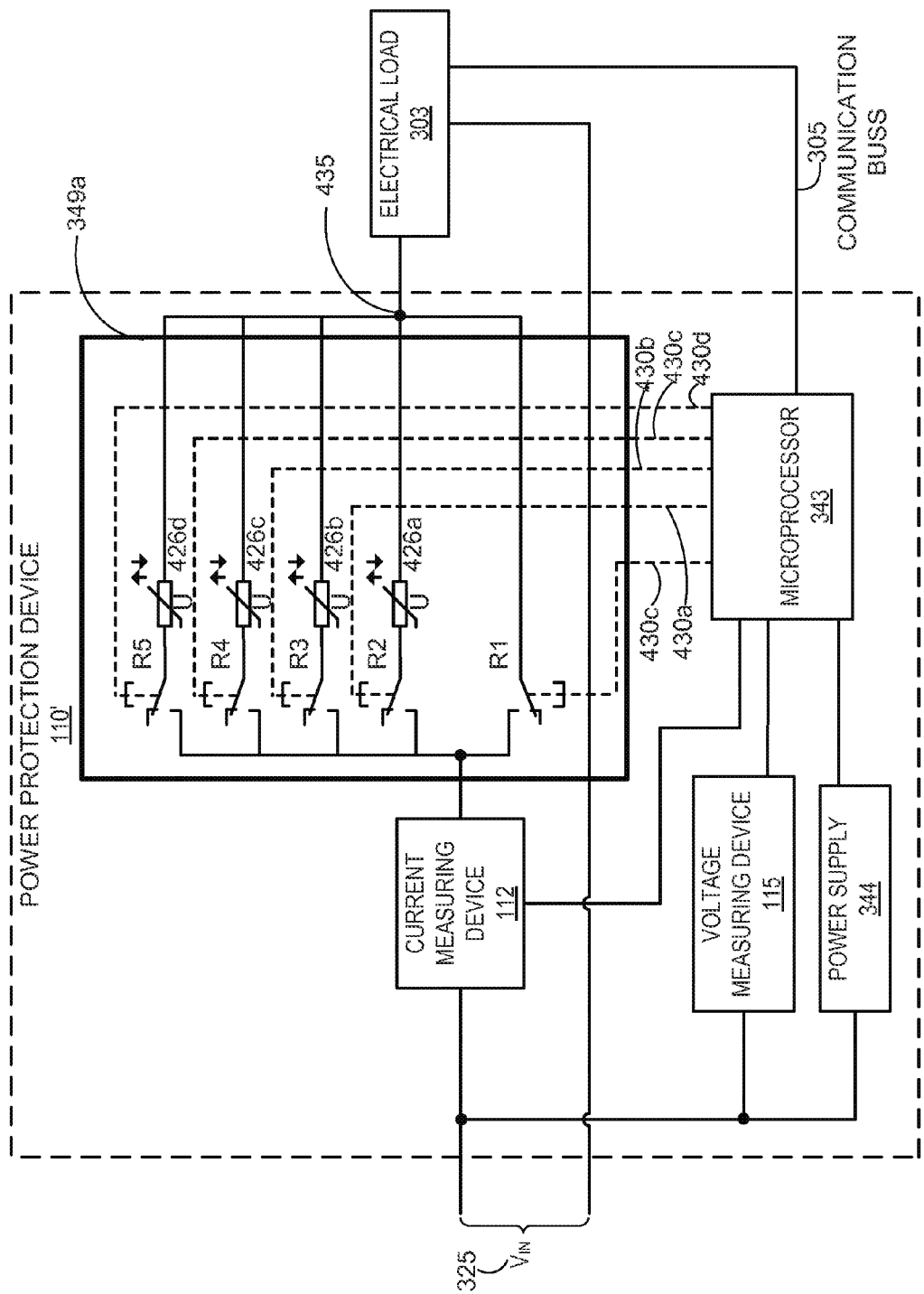
FIG. 4 — EXEMPLARY SELECTIVE CURRENT LIMITING PROTECTION CIRCUIT

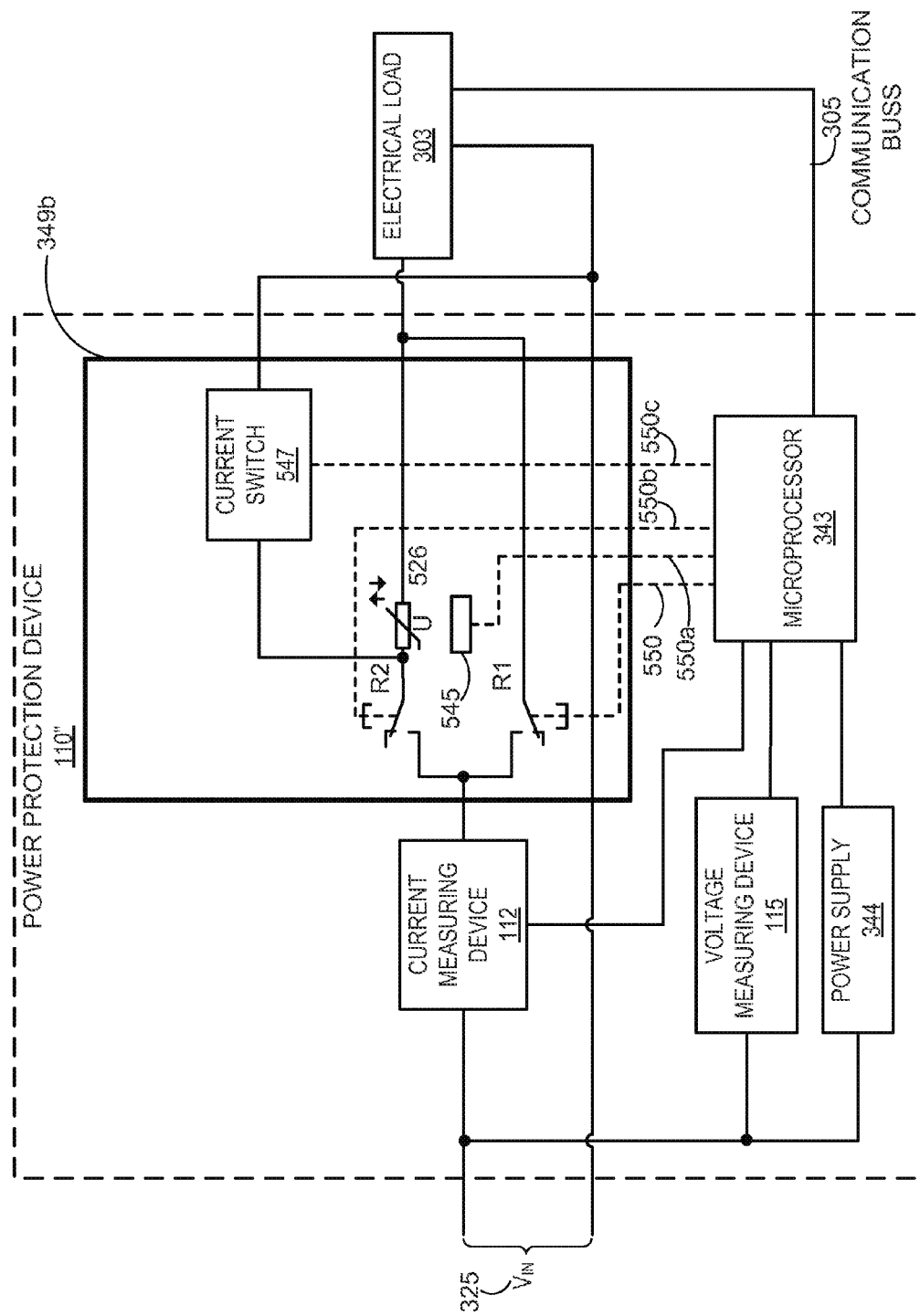
FIG. 5 — EXEMPLARY SELECTIVE CURRENT LIMITING PROTECTION CIRCUIT

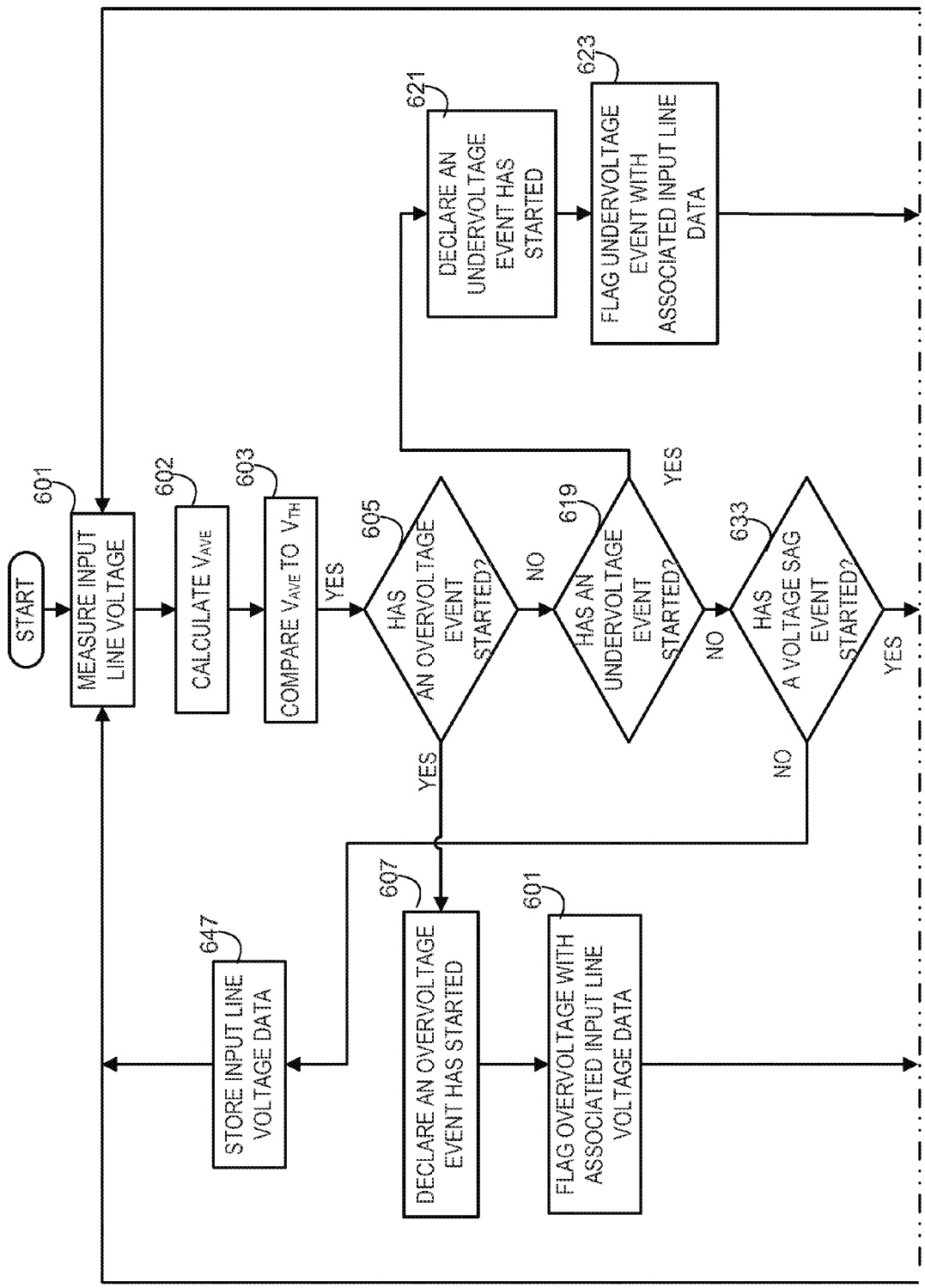
FIG. 6A1 – EXEMPLARY VOLTAGE MEASURING PROCESS

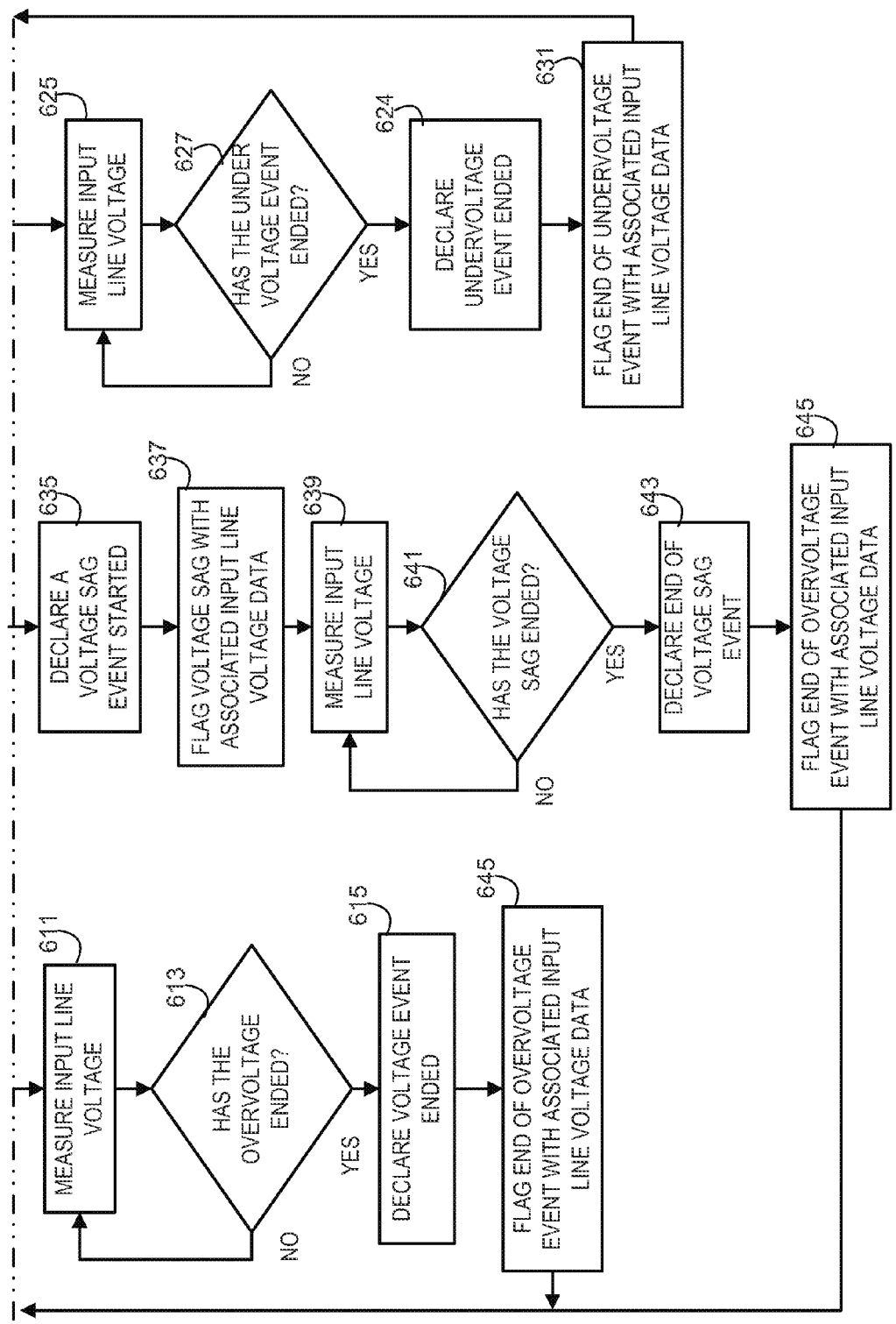
FIG. 6A2 – EXEMPLARY VOLTAGE MEASURING PROCESS

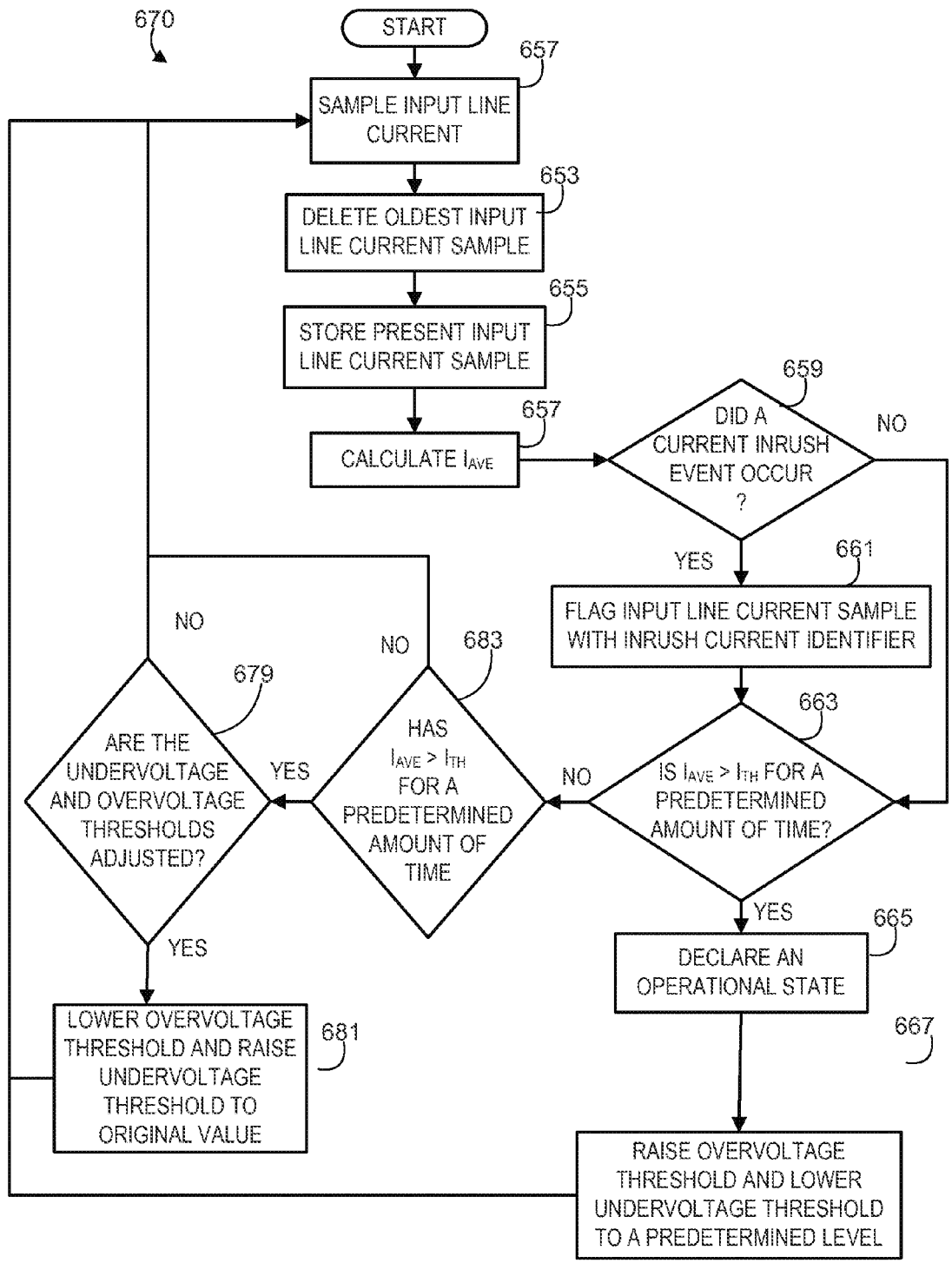
FIG. 6B – EXEMPLARY CURRENT MEASURING PROCESS

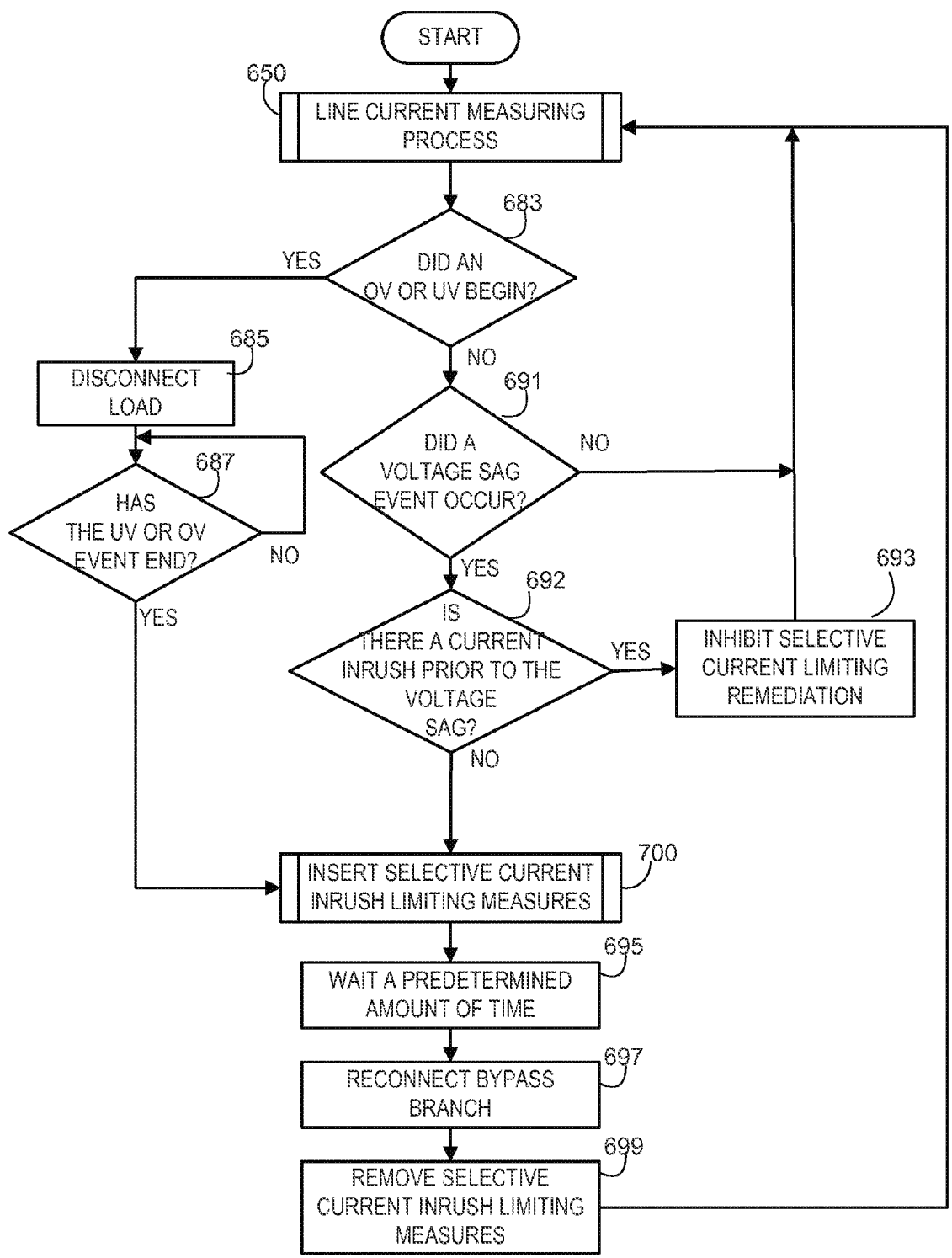
FIG. 6C – PROCESS FOR DETERMINING POWER DISTURBANCE REMEDIATION OR INHIBITION

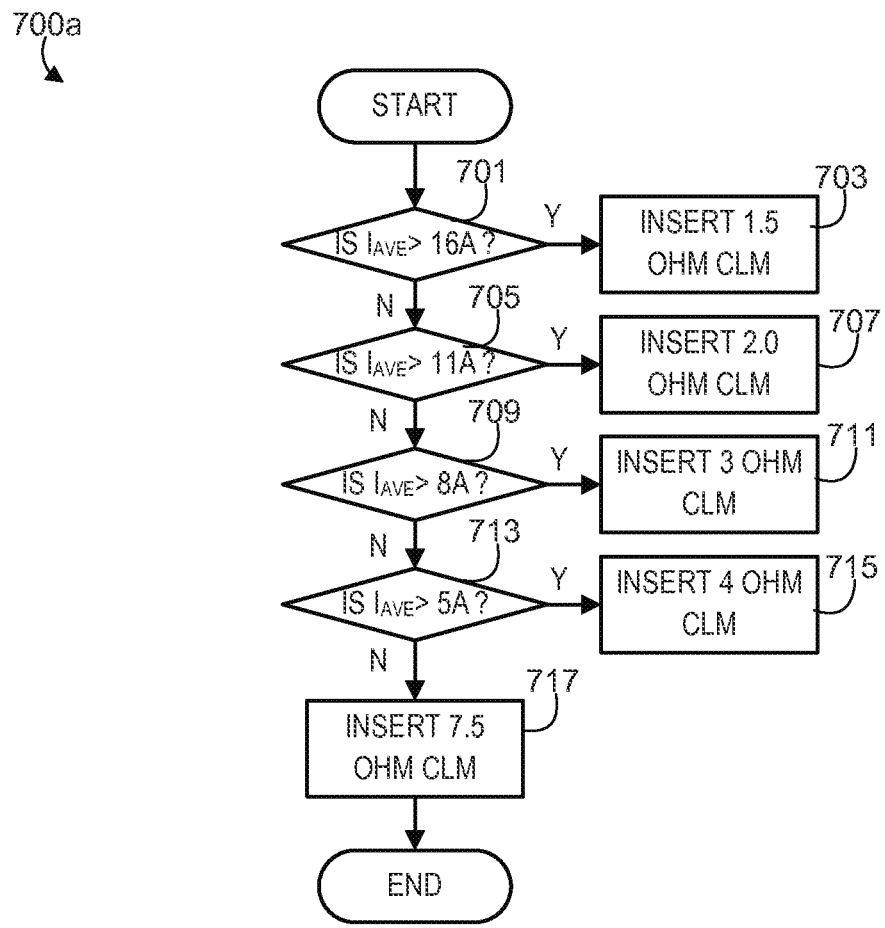
*FIG. 7A* – SELECTIVE CURRENT LIMITING PROCESS

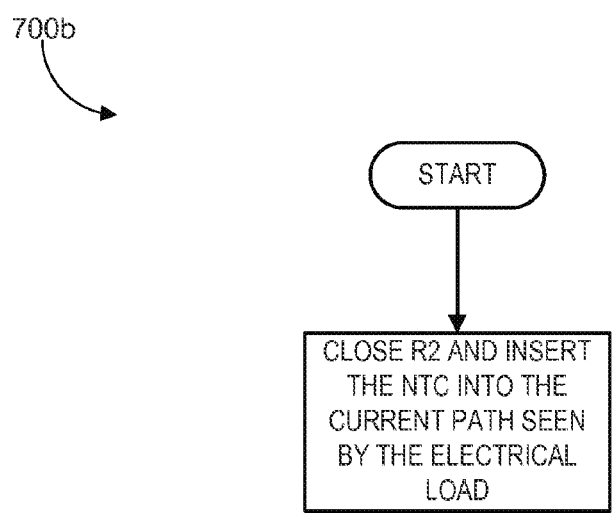
FIG. 7B – TEMPERATURE MODULATED SELECTIVE CURRENT LIMITING PROCESS

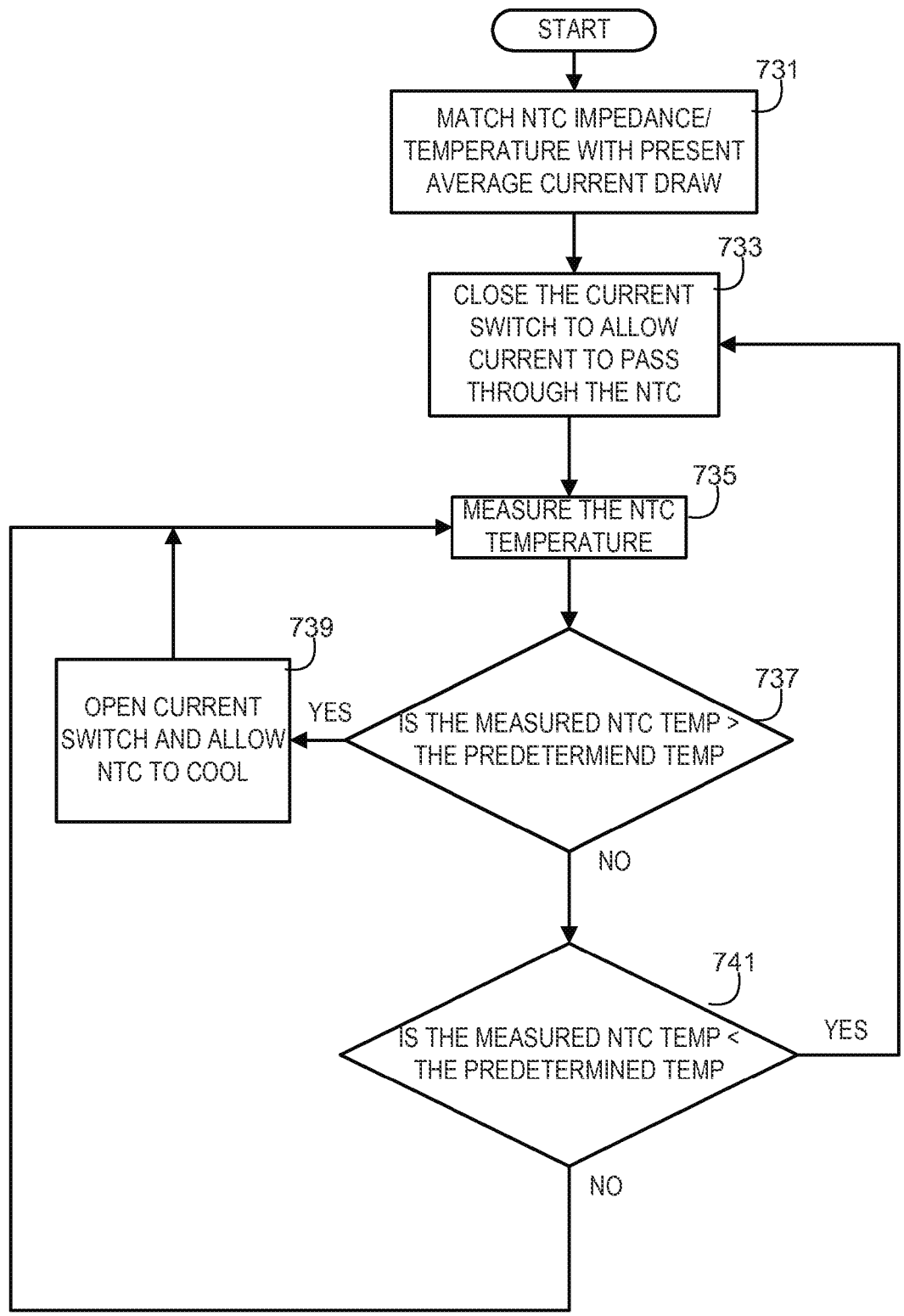
FIG. 7C – EXEMPLARY NTC TEMPERATURE MODULATION PROCESS

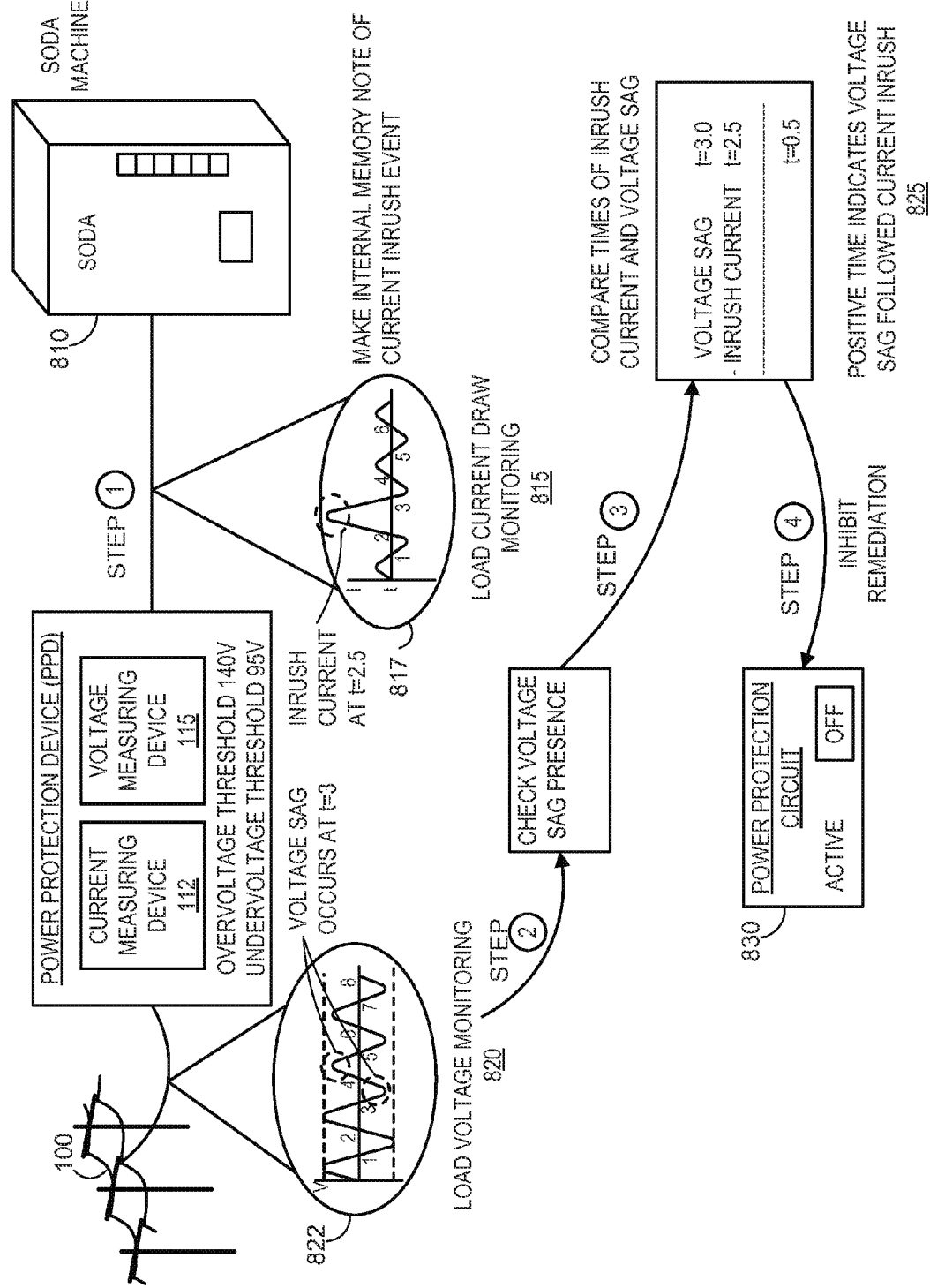
FIG. 8 – EXEMPLARY IN RUSH CURRENT SCENARIO

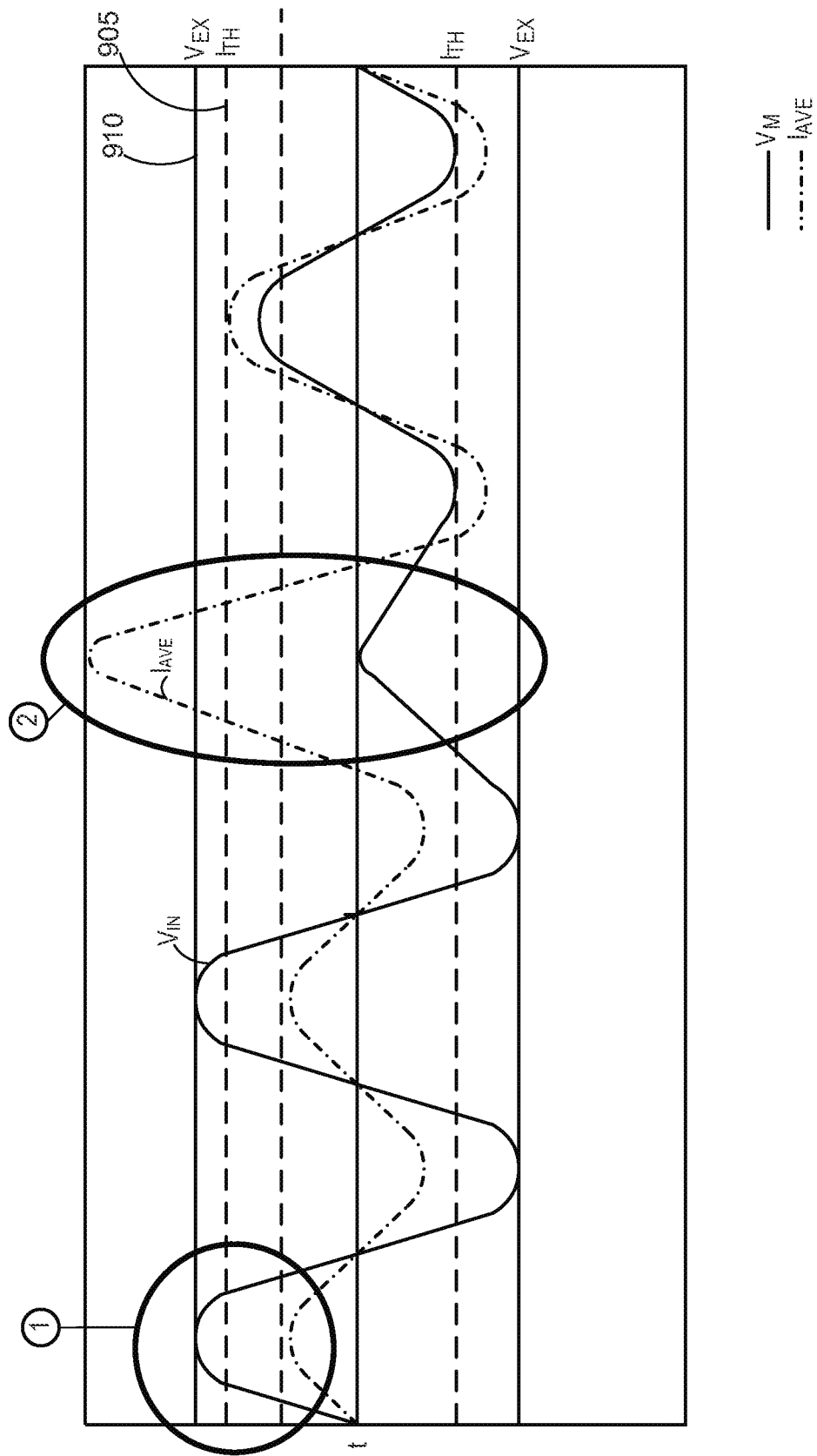
FIG. 9 – EXEMPLARY VOLTAGE VS. CURRENT CHARACTERISTIC COMPARISON IN CONNECTION WITH CURRENT INRUSH SCENARIO

SYSTEMS AND METHODS FOR DETECTING AND DETERMINING SOURCES OF POWER DISTURBANCES IN CONNECTION WITH EFFECTIVE REMEDIATION

CROSS REFERENCE TO RELATED APPLICATION

This application claims benefit under 35 U.S.C. §119(e) of U.S. Provisional Patent Application No. 61/783,567, filed Mar. 14, 2013, and entitled "Systems and Methods for Selective Current Limiting and Voltage Sag Discrimination", which is incorporated herein by reference as if set forth herein in its entirety.

TECHNICAL FIELD

The present systems and methods relate generally to detection of power disturbances and appropriate remediation, and more particularly to the determination of power disturbances due to a load on a branch circuit or a power grid anomaly. Further, the present systems and methods relate generally to selective power disturbance remediation due to voltage and current parameters.

BACKGROUND

Power disturbances on a power grid system are not limited solely to lighting-induced voltage surges as previously thought. Voltage disturbances on power grid systems may embody other common forms such as voltage sags, momentary interruptions, overvoltages, undervoltages, and power outages. Voltage sags on the power grid may occur when short circuits occur somewhere on the grid, a large load is connected to the grid, a sudden load change, etc.

Voltage sags may account for 90-95% of power disturbance events, particularly in commercial and industrial facilities. Voltage sags are voltage reductions in the nominal line voltage that persist for a particular time period. Typically, voltage sags are characterized by drops of between 10%-90% of nominal (system) line voltages. The drops in voltage typically last from a cycle (16.6 millisecond) to a second or so, or tens of milliseconds to hundreds of milliseconds.

Certain method and apparatus for correcting certain types and forms of voltage sags are known. One example is U.S. patent application Ser. No. 13/449,870, by Deepakraj Divan, filed Apr. 18, 2012, entitled "Voltage Sag Corrector Using a Variable Duty Cycle Boost Converter," assigned to the same assignee as the present application. This patent application and its contents are incorporated by reference herein as if made a part hereof. While voltage sag correction is one method of addressing power disturbances having certain properties, such voltage sag correctors may not be suitable for many industrial applications.

Certain methods and apparatus for reducing inrush current to electrical loads due to voltage sags are also known. For example, U.S. Pat. No. 8,039,994, of Deepakraj Divan, entitled Reduction of Inrush Current Due to Voltage Sags, owned by Georgia Tech Research Corporation and licensed to the assignee of this application, and its associated patent family, is one such example. This patent and its contents are incorporated by reference herein as if made a part hereof.

Other examples include U.S. Pat. No. 8,035,938, Active Current Surge Limiters, of Deepakraj Divan, also owned by Georgia Tech Research Corporation and licensed to the assignee hereof, and its associated patent family. This patent and its contents are also incorporated by reference herein as if made a part hereof.

Another example includes U.S. Pat. No. 8,411,403, Voltage Surge and Overvoltage Protection with Current Surge Protection, also of Deepakraj Divan, also owned by Georgia Tech Research Corporation and licensed to the assignee hereof, and its associated patent family. This patent and its contents are also incorporated by reference herein as if made a part hereof.

The need to identify the causes of different voltage disturbances and protect electrical loads have influenced the advent of intelligent power protection devices that monitor input line voltages for fluctuations and implement various forms of remediation or protection from resultant phenomena such as inrush currents. Some known power protection devices reside near a source voltage and some are located closer to a load, and attempt to monitor the voltage as it is supplied to the electrical load. Some intelligent power protection devices attempt to reduce "nuisance trips" (i.e., unwanted disconnections of the connected electrical load from the power source) by implementing delays or averaging techniques of the incoming supply voltage.

Most buildings, structures, or facilities have an input power feed from a main power distribution line that feeds a central connection point (e.g., fuse panel, breaker panel, distribution panel, etc.). A branch circuit is the power feeder circuit that leaves the central connection point and provides electrical power for at least one electrical load. As will be generally understood, more than one electrical load may be present on a single branch circuit, wherein multiple electrical loads are connected in parallel. Voltage drops or voltage sags are known to occur between the central connection point and the entry point of the load. There are multiple causes for a branch circuit-based voltage sag, such as incorrect feeder wire size, wherein the improper wire impedance being inserted into the circuit can cause a greater than necessary voltage drop. Additionally, when an electrical load starts, specifically an inductive electrical load, the voltage on the branch circuit will decrease. Further, if there is more than one electrical load on the branch, the reduced voltage is also seen by the each electrical load on the branch.

However, some of the remediation techniques do not incorporate the working state of the load device into consideration prior to remediation of the voltage disturbance. For example, with some mission-critical electrical load devices such as production printers or manufacturing equipment, it may be desirable to either inhibit remediation or relax the disturbance detection parameters based on the working state of the protected electrical load in order to allow the protected electrical load device to complete its required task. Further, allowing relaxed parameters may not disturb the load equipment if conditions momentarily fall below less than desirable conditions. As is generally understood, inserting a current limiting device before voltage recovery reduces the current inrush. Furthermore, if the electrical load is causing a branch circuit-based sag, additional current limitation is not necessary as it further starves the electrical load of needed voltage, which may cause an unintentional nuisance trip.

Grid-based voltage sags have a tendency to starve electrical loads of voltage, which generally discharges the internal capacitance of the load device. At the recovery point from a brief voltage sag, power interruption, or power outage, electrical loads pull a large current inrush in order to re-energize internal components. The current inrush is usually unabated, as the internal current limiting component commonly used by the electrical device to limit the current at turn-on does not have time to reset during these brief voltage sags or power outages. One form of power disturbance remediation is to insert an electrical impedance following a voltage sag, power disturbance, etc. The electrical impedance can be a standard resistor, a negative temperature coefficient resistor (NTC or thermistor), or any other resistive or reactive component inserted in to the circuit to reduce the amount of current inrush that occurs during the recovery of a power disturbance.

Some current limiting circuits utilize a single impedance source to compensate the onset of a current inrush to a load or circuit. This single impedance may not contain the most appropriate value to limit the amount of current drawn due to the nature of the particular power disturbance occurrence. Regardless the cause of the current inrush (recovery from voltage sag, recovery from power outage, recovery from a undervoltage, reconnect after an overvoltage, etc.), the value of the single impedance source inserted to reduce the current surge can cause the voltage presented to the electrical load to momentarily reduce due to the voltage drop across the inserted resistive element. This reduction in voltage can sometimes cause the connected electrical load to unintentionally turn off (e.g., nuisance trip) due to the voltage presented to the electrical load to drop below the required level for operation. An unintentional loss of power to critical load systems may potentially be severely damaging and costly to operations.

Therefore, the applicant believes there is a long-felt but unresolved need for a system or method that monitors various input line voltages and effectuates various remediation techniques more flexibly. Moreover, it is believed there is a need for a system or method to effectively recognize potential causes for nuisance trips and adjust detection parameters to enable efficient remediation measures. Further, it is believed there is a need for a system and method that can appropriately modulate inserted impedance values of power-disturbance remediation circuits.

BRIEF SUMMARY OF THE DISCLOSURE

Briefly described, and according to one embodiment, aspects of the present disclosure generally relate to systems and methods for efficiently remediating an undesirable input power voltage due to a power disturbance. According to one embodiment, a power protection device (PPD) determines the operational state of an electrical load device being protected by a power protection device in order to make a determination if remediation as a response to a power disturbance should be provided or inhibited.

In one embodiment, the operational state of an electrical load device is determined by use of a current sensing or measuring device that monitors the current draw of the electric load. In one embodiment, the PPD may relax the disturbance detection parameters or inhibit remediation according to predetermined load state to ensure that the load maintains proper functionality. In another embodiment, the PPD may remediate a power disturbance according to a load state and/or line voltage condition. Further and according to another aspect, the PPD may remediate a power disturbance according to a load current anomaly and/or line voltage conditions. In further embodiments, aspects of the PPD generally enable the system to determine whether the source of the voltage disturbance is due to load operations or if the source of the voltage disturbance is from the power grid. Generally, the source of a voltage disturbance will dictate the execution and/or inhibition of remediation.

In one embodiment, the PPD comprises a selectively variable current inrush limiting apparatus, wherein various impedance mechanisms are inserted into the voltage and current path to the load according to the current draw of an electrical load device operation as measured by current measuring device. In one aspect, multiple impedance paths are connected in parallel to allow control circuit, such as a microprocessor, to choose the proper current limiting impedance value based on the current draw of the electrical load device prior to the onset of a voltage sag or other power interruption that can cause a current inrush at the point of voltage recovery.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is an exemplary block diagram of a power protection device environment, according to one embodiment of the present disclosure.

FIG. 2 illustrates an exemplary current versus voltage waveform characteristic comparison of amplitude versus time, according to one embodiment of the present disclosure.

FIG. 3 illustrates a power protection device architecture, according to one embodiment of the present disclosure.

FIG. 4 illustrates an embodiment of a selective current inrush limiting protection circuit, according to one embodiment of the present disclosure.

FIG. 5 illustrates an alternate embodiment of a selective current inrush limiting protection circuit, according to one embodiment of the present disclosure.

FIG. 6A1 is flow chart describing a first portion of a process for determining various voltage disturbances, according to one embodiment of the present disclosure.

FIG. 6A2 is flow chart describing a second portion of a process for determining various voltage disturbances, according to one embodiment of the present disclosure.

FIG. 6B is a flow chart describing a process for determining a current measuring process, according to one embodiment of the present disclosure.

FIG. 6C is a flow chart describing a process for determining power protection device remediation or inhibition, according to one embodiment of the present disclosure.

FIG. 7A is a flow chart illustrating a process of selective current limiting based on the average load current, according to one embodiment of the present disclosure.

FIG. 7B is a flow chart illustrating a process of selective current limiting based on the average load current, according to one embodiment of the present disclosure.

FIG. 7C is a flow chart illustrating a process of NTC temperature modulation based on the average load current, according to one embodiment of the present disclosure.

FIG. 8 is an exemplary block diagram of a power protection device environment, according to one embodiment of the present disclosure.

FIG. 9 illustrates an exemplary current versus voltage waveform characteristic comparison of amplitude versus time, according to one embodiment of the present disclosure.

DETAILED DESCRIPTION

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for efficiently remediating an undesirable input power voltage due to a power disturbance. According to one embodiment, a power protection device (PPD) determines the operational state of an electrical load device being protected by a power protection device in order to make a determination if remediation as a response to a power disturbance should be inhibited. In one embodiment, the operational state of the electrical load device is determined by use of a current sensing mechanism that monitors the current draw of the electric load. In one embodiment, the PPD may relax the disturbance detection parameters or inhibit remediation according to predetermined load state to ensure that the load maintains proper functionality. In another embodiment, the PPD may remediate a power disturbance according to a load state and/or line voltage condition. Further and according to another aspect, the PPD may remediate a power disturbance according to a load current anomaly and/or line voltage conditions. In further embodiments, aspects of the PPD generally enable the system to determine whether the source of the voltage disturbance is due to load operations or if the source of the voltage disturbance is from the power grid. Generally, the source of a voltage disturbance will dictate the execution and/or inhibition of remediation.

In one embodiment, the PPD comprises a selectively variable current inrush limiting apparatus, wherein various impedance mechanisms are inserted into the voltage and current path to the load according to the current draw of an electrical load device operation as measured by current measuring device. In one aspect, multiple impedance paths are connected in parallel to allow a microprocessor to choose the proper current limiting impedance value based on the current draw of the electrical load device prior to the onset of a voltage sag or other power interruption that can cause a current inrush at the point of voltage recovery.

Exemplary Embodiment

Referring now to the figures, FIG. 1 illustrates an embodiment of a power protection device (PPD) 110 in an exemplary environment, constructed and operated in accordance with various aspects of the present disclosure. In general, FIG. 1 illustrates a scenario involving the determination of an operative state of an exemplary load (e.g., a mass production color printer 120) corresponding to power disturbance source identification and appropriate related remediation of the associated power disturbance.

More specifically, FIG. 1 illustrates an exemplary load in a running state, the detection of a power disturbance, namely a voltage sag, within the input power voltage, and a decision to inhibit voltage disturbance remediation. Assume that the mass production color printer 120 is a load system significant to an operating companies business, whereby stopping a printing process may be detrimental to the printer's business operations. It is known that many production color printers 120 can tolerate a range of operating voltages without undue risk of damage or fault. For example, some production color printers can safely tolerate an input power voltage variation of +30V and −30V. In this exemplary scenario, a power protection device 110, coupled to a mass production color printer 120, is coupled to an input AC power source (e.g. a power line 100, a distributed power system, etc.). Further, an input AC power source maybe referred to herein as a supply voltage, an input power voltage, an input line voltage, etc.

Assume that the protection settings of the PPD 110 has an overvoltage threshold of 140V and an undervoltage threshold of 95V, wherein some form of remediation will be invoked if the power voltage falls outside of the range of the thresholds. In one aspect, the PPD 110 continuously measures and stores the average current draw of the load during its operation and identifies a plurality of predetermined current-related events (e.g., current inrush, over threshold current draws, and current anomalies) according to the characteristics of the measured average current draw. Typically, the window of time for the stored current measurements may comprise a duration of anywhere between 60 cycles of data to hours of data according to the demand of the system. In certain instances, the PPD may adjust the overvoltage or undervoltage thresholds according to various parameters indicative of a load's operating state. For example, the load may be in a running state, comprise a critical system that should not be interrupted unless there is significant risk of damage or disruption to the job, and therefore, the overvoltage and undervoltage thresholds may adjust to enable a larger tolerance for various power disturbances such that the operation of the load will not be interrupted for minor occurrences that do not present undue risk.

The PPD 110 also measures and averages voltages supplied to the load to identify various predetermined events (e.g., voltage sag, momentary power outage, power disruption, undervoltage, overvoltage, etc.) and analyzes the relationship between the supply voltage and the stored average current draw of the current to determine the source of the occasion or power disturbance. Accordingly, the PPD 110 stores a plurality of voltage samples as an average input line voltage measurement $V_{AVE}$ to determine the input line voltage trends. Further, the PPD 110 detects various power disturbances that are typically identified as an average input line voltage measurement $V_{AVE}$ magnitude, which has remained at a certain magnitude for a predetermined amount of time (as will be described further herein).

As will be understood, typically, voltage sags are characterized by drops of between 10%-90% of nominal (system) input line voltages. The drops in voltage typically last from a cycle (16.6 millisecond) to a second or so, or tens of milliseconds to hundreds of milliseconds. Similarly, an undervoltage is characterized by drops of similar nature of the nominal (system) input line voltage, but the drops in an undervoltage condition typically of a longer duration than a voltage sag. The required duration utilized to determine an undervoltage may comprise any number of cycles, seconds, milliseconds, minutes, hours, etc., but typically a duration of an undervoltage is approximately 2 seconds. Further, the PPD 110 determines whether to remediate the power disturbance or to inhibit remediation because the power disturbance is not significant to the operation of the load or remediation may impact operation of the load.

Still referring to FIG. 1, a particular sequence of events in this exemplary scenario is illustrated sequentially as numbered circles, each of which is associated with a step of a process as herein described. Starting at step 1, a power protection device (PPD) 110 comprising a current measuring device 112 is coupled to an electrical load and an input voltage source (e.g., a power line 100). In this specific exemplary scenario, assume that the electrical load comprises a mass production color printer 120. As will be generally understood by one of ordinary skill in the art, any electrical load current variations detected by the current measuring may be due to differing connected equipment, but also may be due to different modes of operation within the same piece of equipment. On some industrial equipment, current inrushes can reach levels up to 50-500 times that of the rated steady-state line current.

Assume that the current measuring device 112 of the PPD is real-time monitoring the average current draw $I_{AVE}$ of the load 117 with an expected threshold current, $I_{TH}$, of 9 amperes (A). Assume that the current draw when the printer is in an operational state of standby mode is 9A. Therefore, in the scenario of FIG. 1, the expected threshold current $I_{TH}$ is set according to the current draw of the electrical load in standby mode. The PPD 110 keeps a running average of the current draw within a window of time where the oldest current measurement sample value is deleted from the average calculation each time a new load current measurement sample is taken.

In the example of FIG. 1, the $I_{AVE}$ is presently shown at 12A, which indicates that the present $I_{AVE}$ is greater than the expected threshold current $I_{TH}$. In this scenario, assume that when the mass production printer 120 is actively printing (at say, full capacity), the current draw will be greater than when it is in standby mode. Assume that the current draw when the printer is in an operation state of standby mode is 9A; therefore, the current threshold, $I_{TH}$, is determined to be 9A. Similarly, the printer may be in an off mode, wherein the current draw is close to 0A. Accordingly, in the scenario shown in FIG. 1, $I_{AVE}$ is greater than $I_{TH}$, indicating that the printer is in an active printing state. As previously described, the mass production color printer 120 is considered an important device to an operative entity, which as at the discretion of the operational entity utilizing the mass production color printer.

Hence, at step 2, the PPD adjusts the overvoltage and undervoltage thresholds to 150V and 90V 125, respectively, to ensure that operation of the mass production color printer 120 does not cease in the event of a power disturbance occurs presenting an input power voltage outside of the previously non-adjusted voltage threshold range. The PPD determines that the mass color printer is in a run mode due to measuring the average current draw $I_{AVE}$ (e.g. 12 A) and identifying the average current draw is $I_{AVE}$ higher than the expected current threshold $I_{TH}$ (e.g. 9A) for a predetermined number of cycles. For example, the predetermined number of cycles may be 4 cycles, but as will be generally understood any number of cycles may be used to determine the operational run state of a load. At step 3, the PPD continuously monitors the line voltage 130 for various predetermined occurrences such as power or voltage disturbances. Assume that occurrences generally comprise various power disturbances such as a voltage sag, a momentary power outage, a power disruption, an undervoltage, an overvoltage, etc. As shown in step 3, during the monitoring process the PPD 110 compares the line voltage to a predetermined expected line voltage within the nominal range of satisfactory operation.

Assume at step 3 that a voltage sag occurs near t=4 for the line voltage supplied to the mass production color printer 120. At step 4, the PPD 110 identifies the onset of a voltage sag 135 near t=4, wherein the measured line voltage is lower than the expected or nominal line voltage. As will be generally understood, the PPD comprises a time stamping component, wherein a time may be associated with various actions/events (e.g., a power disturbance, a current inrush, an input line voltage sample, an input line current sample, etc.). Accordingly, the PPD 110 determines whether the source of the voltage sag is from the branch circuit (e.g. due to the steady state current draw of the mass color printer 120) or whether the voltage sag is from a power-grid power disturbance.

At step 5, the PPD determines the source of the voltage sag, wherein the PPD checks the stored average current draw $I_{AVE}$ to determine if a current inrush is present near the voltage sag in the time domain. As previously mentioned, a current inrush event typically comprises a time stamp dictating when the current inrush event occurred. Likewise, a power disturbance typically comprises a time stamp indicating when the event occurred. Therefore, in one embodiment, the PPD will compare the times of the two events to determine which occurred first, the difference between the events, and any other relationship between them. If a current inrush precedes the onset of the voltage sag, this more likely indicates that the load caused the voltage sag on the particular circuit branch. Alternatively, if a voltage sag occurs prior to a current inrush, or when there is no current inrush near the time of the voltage sag, generally the voltage sag is more likely due to an external source such as a power disturbance on a local branch circuit or on the power grid.

At step 6, the PPD 110 determines there is not a current inrush near the time of the onset of the voltage sag, indicating the voltage sag is due to power disturbance on the grid, and remediation is warranted. As known to those skilled in the art, during a voltage sag or other similar power disturbance, the capacitance within the certain types of loads will discharge its stored energy as the stored energy compensates for the lower input power voltage. Subsequently, when the voltage sag recovers, the capacitance within the electrical load generally draws a large amount of current to replenish the energy that was depleted, creating a large current inrush and a need for remediation. Assume that the power protection device 110 is specifically configured according to the typical current draw of the mass production printer 120. In this example, the protection circuit within the power protection device activates a 2 ohm current inrush limiting mechanism 145, according to predetermined parameters, for example, as shown in Table 1 and the description of Table 1.

After remediation has been effected, the PPD 110 generally has a wait period or built-in timing function, wherein the remediation stays active until a predetermined period of time has passed for the disturbance to end and power to be restored to within the nominal operating range. At step 7, the PPD waits the allotted predetermined period of time before removing the current inrush remediation measures, as shown in step 8. Accordingly, after the current remediation measures are removed the circuit is returned to the operating state as previously described in connection with step 2 with adjusted overvoltage and undervoltage thresholds.

It will be appreciated that the current remediation measures according to this disclosure may be overridden and insertion of the current remediation measures in to the current path will be inhibited (as will be described in greater detail in connection with the scenarios shown in FIG. 8). It will further be appreciated that the PPD detects a power disturbance within the branch circuit of the electrical load and determine current remediation measures according to the identification of a branch circuit-based voltage sag. It will still be further appreciated that the branch circuit-based voltage sag may be due to a particular electrical load on the branch circuit or due to another electrical load on the branch circuit, wherein each electrical load on the branch circuit will receive a lower amplitude input power voltage due to the branch circuit-based voltage sag.

FIG. 2 illustrates the voltage and current characteristic comparison 140 (step 5 in FIG. 1) in connection with the discussion example of FIG. 1. As discussed, in step 5 of FIG. 1, the PPD 110 compares the presence of current inrush prior to the onset of the power disturbance (e.g. voltage sag) within the time domain. Accordingly, FIG. 2 is an illustrative representation of the voltage and current waveform characteristic relationship to identify the presence of a current event (e.g., current inrush, increase in current draw, etc.), wherein the presence of the current inrush or increase in current draw may determine that the power disturbance was caused by an electrical load fed from the branch circuit. If a current anomaly is present, the PPD further determines where the current inrush resides within the time domain in comparison with a power disturbance such as an undervoltage, overvoltage, voltage sag, etc.

As shown at numbered circle 1 of FIG. 2, the current $I_{AVE}$ and voltage $V_M$ are typical sine waves. Assume and as illustrated, the average current, $I_{AVE}$ is trending over the indicated threshold current, $I_{TH}$, 205, correlating with step 1 of FIG. 1. Accordingly and as previously described, an $I_{AVE}$ trending over the predetermined current threshold indicates that the load device, e.g. the mass production color printer, is in a running state and is still considered an important load to the operational entity and should not be disconnected from power unless there is a significant power disturbance that presents risk of damage to the equipment. Further, at numbered circle 1 of FIG. 2, the measured voltage $V_M$ is near the expected voltage $V_{EX}$ threshold 210, indicating a generally normal steady state of the mass production color printer 120.

The numbered circle 2 of FIG. 2 identifies an onset of a voltage sag, wherein the measured voltage $V_M$ level is trending lower than the expected voltage $V_{EX}$ threshold 210. Further, the $I_{AVE}$ is consistently trending above the current threshold 205 without a current inrush occurrence, which indicates a steady state running condition of the load, e.g. the mass production color printer 120. According to various embodiments of the present disclosure, the PPD 110 compares the voltage and current characteristics in the time domain to determine various predetermined conditions. For example and as illustrated in FIG. 2 and described in connection with FIG. 1, a voltage sag without an increase in measured current $I_{AVE}$ or a current inrush in the near present time prior to the voltage sag typically indicates a power disturbance originating in the power grid and generally necessitates power disturbance remediation.

FIG. 3 illustrates a power protection device (PPD) 110, which is generally connected at an interface between an input line voltage 325 and an electrical load 303 according to one embodiment of the present disclosure. In one aspect, the PPD 110 comprises a current measuring device 112 for measuring the current drawn by the electrical load 303. The amount of current drawn by the electrical load 303 may be used as an indicator of the electrical load's operational state. For example, when an electrical load is running, it typically draws more current than when the electrical load is in a standby mode. In another aspect, the current measuring device 112 is used not only to measure average current draw prior to any possible disturbance, but also senses the current inrushes such as those due to inductive electrical loads.

In one embodiment, the current draw is measured in real-time by the current measuring device 112. The current draw information is sent to the microprocessor 343 for further analysis. According to various embodiments, the current measuring device 112 comprises any type of current sensing circuit. For example and in one embodiment, the current measuring device 112 may comprise a stand-alone current measuring integrated circuit, which passes measurements to the microprocessor 343. In another embodiment, the current measuring device 112 may comprises a current transformer connected either to an external integrated circuit or to analog and/or digital ports within the central processing circuit 343. In another embodiment, the current measuring device 343 comprises a series resistor connected either to an external integrated circuit or to analog to digital ports within the central processing circuit 343.

According to one aspect, the PPD 110 keeps a running average of the current draw within a window of time where the oldest current measurement sample value is deleted from the average calculation each time a new load current measurement sample is taken. As previously described, the window of time could be of any length from 1 cycle to hours of data, but a window of between 240 and 480 electrical cycles or 4 to 8 seconds is generally utilized. In addition, instantaneous current inrushes are monitored by comparing the current sample to the previous sample and looking for a large differentiation in amplitude. Accordingly, if the differentiation amount continually increases and the amplitude is above a threshold considerably higher than the average current draw of the electrical load 303, then a marker in memory is set within the power protection device 110 indicating that a current inrush has just occurred. As will be generally understood by one of ordinary skill in the art, the process of comparing a current sample to a previous sample is mathematically equivalent to taking the first derivative of the current signal.

Still referring to FIG. 3, in one embodiment, the PPD 110 further comprises a voltage measuring device 115 for sensing and measuring voltages connected to the PPD. According to one aspect, the voltage measuring device 115 ensures the line voltage $V_{IN}$ 325 is within an acceptable predetermined nominal operating range prior to the connection of the load to prevent damage to the load by supplying an input power voltage outside of an acceptable range of the load. Line voltage 325 is generally measured in real-time by the voltage measuring device 115. This information is also sent to the microprocessor 343.

Generally, after the line voltage 325 is determined to be satisfactory for powering the attached electrical load 303, the PPD connects the electrical load 303 to the power source. In certain embodiments, the voltage measuring device 115 can be any type of circuit providing either an isolated or a non-isolated interface between the voltage being monitored and the microprocessor 343. In another embodiment, the voltage measuring device 115 could also be a stand-alone voltage measurement device 112 that reads the voltage and passes the value to the microprocessor 343.

According to one aspect of the embodiment of FIG. 3, the PPD 110 further comprises a microprocessor 343 that is operative for executing an algorithm for detecting and remediating power grid disturbances, as well as to making remediation-inhibiting decisions based on current and voltage measurements received from the current measuring device 112 and the voltage measuring device 115. In one aspect, the microprocessor 343 with the use of voltage measuring device 115 continually monitors the input line voltage 325 to detect voltage anomalies, voltage signatures, etc. In one aspect, some of the various voltage signatures being monitored comprise voltage sags, momentary power disruptions, overvoltage scenarios, undervoltage scenarios, etc. In various embodiments, the microprocessor 343 may comprise any type of central processing unit or state machine such as a microprocessor, microcontroller, field programmable gate array (FPGA), or any other device that can execute algorithms for detecting and remediating power disturbances. In other embodiments, the microprocessor 343 may comprise peripheral functionality such as an analog-to-digital converter, serial communication ports (e.g., I2C, SPI port, etc.) or other circuitry to communicate with other circuits or integrated circuits.

In one aspect, the microprocessor 343 operates in a monitoring mode where it continually samples the line voltage 325 to detect power disturbances such as, but not limited to voltage sags, overvoltages, undervoltages, momentary power interruptions, and power outages. In the discussion in FIG. 1, the power disturbance comprised a voltage sag due to a power grid anomaly, wherein the measured voltage started trending at a level lower than the expected value. In another aspect, a sample-by-sample comparison between the incoming line voltage and a predetermined expected voltage at the same point of the correct line voltage may be used to determine a line voltage disturbance in less than a ½ or ¼ cycle. According to various aspects, measured values are compared to predetermined thresholds for each disturbance type in order to determine if remediation is required or should be inhibited. In one aspect, prior to and during the detection of voltage disturbances, the microprocessor 343 determines whether to change the parameters for voltage disturbance detection or to inhibit remediation for a detected power disturbance.

In one exemplary aspect, the determination is made by measuring the average current draw $I_{AVE}$ of the electrical load 303, detecting current inrushes and/or anomalies, storing the average current draw data, and comparing to the detection of voltage disturbances via the microprocessor 343. Further, in another aspect, as mentioned in connection with FIG. 1, the microprocessor typically comprises a time stamping mechanism that can associate a time with a particular event, action, data, etc.

In one aspect, by detecting current inrushes that occur prior to voltage disturbances, the microprocessor 343 can evaluate whether or not to remediate against the current inrush. Generally, voltage sags or momentary power interruptions to an electrical load can cause current inrushes when the input line voltage returns to the nominal voltage. Therefore, as a voltage sag or power interruption is experienced at an electrical load 303, the charge on the capacitors internal to an electrical load reduce because energy stored in the capacitor is dissipated by other circuitry within the electrical load. When the voltage sag or momentary power outage recovers, the now-discharged capacitors draw a relatively unabated current impulse or current inrush because the electrical load's own current inrush limiting component, if present, may not have had enough time to reset. Typical reset times for current inrush limiting devices, such as negative temperature coefficient thermistors found in some internal protective circuits within electrical loads, vary based on their chemical characteristic and temperature but it is usually approximately 30 seconds to 2 minutes. However, time between onset and recovery for grid-based and branch circuit-based voltage sags can be as quick as 2 AC cycles (32 mS).

According to one embodiment, the microprocessor 343 further comprises a timer mechanism for determining the time remediation recovery and reset of the current inrush limiting components, wherein a predetermined period is generally utilized before the current inrush limiting components are removed from the circuit. In one embodiment, the microprocessor 343 continuously monitors the line voltage 325 until the power disturbance and recovery has completed. Accordingly, the microprocessor waits a predetermined amount of time afterwards before restoring the protection circuit 349 back to a non-remediation state.

Still referring to FIG. 3 and in one embodiment, the PPD 110 comprises a power supply 344 for providing DC voltage to power the PPD circuit. According to one aspect, the power supply 344 provides power to the microprocessor 343 and the microprocessor provides power to the other elements in the PPD 110. In another aspect, the power supply 344 directly provides power to the other elements in the PPD 110.

As further shown in the FIG. 3 embodiment, a protection circuit 349 is generally controlled by a control circuit, such as a microprocessor 343. According to one aspect, the protection circuit 349 performs various power disturbance remediation tasks including but not limited to isolating the electrical load 303 with the use of a switching component from the input line voltage 325. In another aspect, the protection circuit 349 provides current inrush limiting protection measures, which certain embodiments will be discussed in greater detail below.

In one embodiment, a communications buss 305 may be utilized to provide a "load functioning" signal to indicate to the power protection device 110 that the electrical load 303 is in use. Such a load functioning signal may be utilized to determine the operational state of the load, either independently or in conjunction with monitoring the average current draw of the electrical load 303. In one aspect, the communications buss 305 transmits the load functioning signal to the microprocessor 343 to inform the microprocessor the operational state of the electrical load 303. The operational state of the electrical load may comprise a running state, a level of a running state (e.g., 50% full capacity), standby state (e.g., not running, but powered on and ready to run), etc. For example, the operational load may transmit a signal via the communications buss 305 to inform the microprocessor 343 that the electrical load 303 is running and to start measuring the average current draw of the electrical load. Further, the communications buss 305 may transmit the level of the running state of the electrical load 303 to the microprocessor 343, such that the microprocessor 343 can determine the appropriate level of remediation according to the level of the running state.

Accordingly and in one aspect, the communications buss 305 could be as simple as a dry relay contact located within the electrical load 303 that changes state when the electrical load 303 is in use. In another aspect, the communications buss 305 could be a higher-level two-way communications buss such as an I2C, USB, SPI, RS232, etc. and the power protection device 110 would then adjust its disturbance detection parameters as described above. In one aspect, the load functioning signal may comprise a binary information signal, wherein one value represents a running state, and the opposite value represents a standby or off state. In another aspect, the load functioning signal may comprise a dynamic signal correlating to various levels of the running state of the electrical load (e.g. proportional to its running capacity on a 1-100% scale).

FIG. 4 illustrates an embodiment of an exemplary power protection device 110' comprising a selective current inrush limiting circuit protection circuit. According to one embodiment, the selective current inrush limiting circuit (SCILC) 349a is connected at an interface between an input line voltage 325 and an electrical load 303. According to one aspect and similar to the FIG. 3 embodiment, the SCILC 349a comprises a voltage measuring device 115, a power supply 344, a current measuring device 340, a microprocessor 343 and an electrical load 303. As will be generally understood, the aforementioned components typically execute the same functions as described for similar components in connection with FIG. 3.

In one embodiment, the SCILC 349a comprises relays R1, R2, R3, R4, and R5 connected in series with selective current inrush limiting components 426a, 426b, 426c, and 426d, respectively. According to one aspect, R1 provides a bypass path around the current inrush limiting components, wherein the impedance in the current path is a predetermined non-current limiting impedance of the PPD 110'. In another aspect, R2, R3, R4, and R5 are arranged in parallel to a node 435 and provide individually or combinatorial selectable current paths containing different values of current inrush limiting component, specifically in this embodiment in the form of negative temperature coefficient thermistors (NTC). In certain embodiments, R1, R2, R3, R4, and R5 may be mechanical relays, solid state relays, silicon-controlled rectifiers (SCRs), or any other switching element. Further, the relays are typically controlled by the microprocessor 343 via control signals through the relay's associated control line 430a, 430b, 430c, 430d, and 430e.

In one embodiment, the SCILC 349a comprises selectively-enabled resistive elements 426a, 426b, 426c, and 426d for reducing the current inrush that an electrical load may draw from a power source. According to one aspect, insertion of the resistive elements into the circuit will generally provide a voltage drop and thereby reduce the amount of current within a circuit path. In one embodiment, the resistive elements 426a, 426b, 426c, and 426d are placed in parallel within the SCILC 349a. In another embodiment, the resistive elements may be placed in series. In yet another embodiment, the resistive elements may be placed in a combination of series and parallel. In one embodiment, the resistive elements 426a, 426b, 426c, and 426d comprise negative temperature coefficient thermistors (NTC).

As will be generally understood by one of ordinary skill in the art, placing the resistive elements in other configurations will still provide various current inrush limiting effects and the disclosed embodiment is not intended to limit the spirit or scope of the present disclosure. Further and in certain embodiments, resistive elements 126 may comprise any resistive element such as a resistor, inductor, or any other device providing real or complex impedance with any resistive value.

According to one embodiment, the SCILC 349a comprises a microprocessor 343 for running a computer-implemented process for detecting and remediating power grid disturbances as well as selecting the value of current inrush limiting component(s). In one embodiment, the microprocessor 343 runs in monitoring mode, in which the microprocessor continually samples the line voltage 325 $V_{IN}$ to detect power disturbances such as but not limited to voltage sags, overvoltages, undervoltages, momentary power interruptions, and power outages. Further, and in one aspect, monitoring mode also continuously samples the current draw of an electrical load, stores a predetermined number of cycles of the current draw, and flags detected current events (e.g., current inrushes, current draw increases, etc.). In one aspect, a monitoring mode of the microprocessor 343 may be achieved by comparing a measured value using an RMS or other averaging method of the line voltage $V_{in}$ 325 over half of a sinusoidal voltage cycle to an expected value of the correct line voltage. Alternately and in another aspect, a sample-by-sample comparison between the incoming line voltage and an expected value at the same point of the correct line voltage may determine a line voltage disturbance in less than half or quarter of a sinusoidal voltage cycle. As will be generally understood, the sample-by-sample comparison of the incoming line voltage and the expected voltage value may determine a line voltage disturbance within any portion of a sinusoidal voltage cycle.

As will be generally understood, measured current and voltage values are compared to predetermined thresholds for each disturbance type and the extent of the disturbance in order to determine if remediation is required. In one embodiment, during the line voltage monitoring process, the microprocessor 343 also measures the average current draw of the electrical load, as described in the FIG. 1 discussion example. Accordingly, the SCILC 349a identifies current values for a predetermined period of time prior to any possible detected power disturbance. This is generally accomplished by keeping a running average of the current draw within a window of time where the oldest current measurement sample value is deleted from the average calculation each time a new load current measurement sample is taken. In certain embodiments, the stored current values are stored locally on the PPD 110', the microprocessor 343, on a hard drive, transmitted to a database, etc. As will be generally understood by one of ordinary skill in the art, the window could be of any length but a window of between 240 and 480 electrical cycles or 4 to 8 seconds is generally utilized. Furthermore and in certain embodiments, processes may be implemented that look at load current trends over normal use to predict the actual load current at the time of remediation if the load current varies regularly over time.

In one embodiment, the microprocessor 343 inserts selectively variable current inrush limiting circuitry as remediation as a result of a detected voltage sag or power disturbance. Generally, during a voltage sag, capacitance within the electrical load 303 discharges as a result of providing make-up power after the supply power is in sag or interruption. At the point of recovery from a voltage sag or momentary interruption, discharged capacitors typically pull an inordinately large amount of current or current inrush, as the load's internal current limiting NTC (if present) has not had sufficient time to cool and therefore regain its current limiting characteristics.

In one embodiment, the value of the NTC within the SCILC is determined by the amount of current the load generally draws during steady state operation. In one aspect, the NTC is placed in series with a switching device to allow it to be inserted in series at or near the onset of a voltage sag and remain in the circuit until after the voltage sag or interruption recovers. In another embodiment, instead of a single NTC, multiple NTCs are switched in series with the load using a plurality of switching devices R2, R3, R4 and R5 shown in FIG. 4. As will be generally understood by one of ordinary skill in the art, although the FIG. 4 embodiment utilizes four NTCs with corresponding switching mechanism, any number and/or combination of NTCs and switching devices may be used and the present embodiment is not meant to limit the spirit or scope of the present disclosure.

According to one aspect, before connecting a line voltage 325 to the power protection device (PPD) 110', all relays R1, R2, R3, R4, and R5 in FIG. 4 are generally open and there is typically no line voltage presented to the electrical load 303. Upon connection of line voltage 325 to the PPD 110', the microprocessor 343 executes an algorithm that checks the line voltage 325 by use of an analog-to-digital converter either residing within the microprocessor itself, or as a part of the voltage measuring device 115 circuit 342. In any case, after the line voltage 325 is determined to be satisfactory for powering the electrical load 303, microprocessor 343 switches R1 closed to connect the line voltage 325 to the electrical load 303. In another aspect, the powering on of the electrical load 303 may be performed by asserting at least one other relay or any combination of relays R2, R3, R4, and/or R5 to provide current inrush limiting upon power up in the event that the electrical load's 303 own internal current inrush limiting device is determined by the selective current inrush limiting circuit 349a to be inoperative due to recently being in the on state and not having sufficient time for the electrical load's 303 internal current inrush limiting component to properly reset. In one aspect, after a predetermined period of time, R1 then closes and all other switching devices are opened. In another aspect, R1 typically remains closed connecting the line voltage 325 to the electrical load 303 bypassing all current inrush limiting components.

Accordingly and in one aspect, the communications buss 305 could be as simple as a dry relay contact located within the electrical load 303 that changes state when the electrical load 303 is in use. In another aspect, the communications buss 305 could be a higher-level two-way communications buss such as an I2C, USB, SPI, RS232, etc. and the power protection device 110 would then adjust its disturbance detection parameters as described above. In one aspect, the load functioning signal may comprise a binary information signal, wherein one value represents a running state, and the opposite value represents a standby or off state. In another aspect, the load functioning signal may comprise a dynamic signal correlating to various levels of the running state of the electrical load.

According to one embodiment and as shown in Table 1, various values of current limiting impedances for selective insertion may be calculated based on a historical current draw of the electrical load in order to keep the resulting voltage seen by the load above 90V. As will be generally understood by one of ordinary skill in the art, many 120V electrical loads can work properly for a period of time if the input voltage is at least above 90V. As shown, the current limiting impedances are inversely varying according to the current draw of the load prior to a voltage disturbance such that after inserting the current limiting impedance, the resultant voltage seen by the load remains above 90V. Further, when a voltage disturbance is detected, remediation is effected. Remediation could be different depending on the disturbance type.

TABLE 1

| Current Draw by the Load | Inserted Current Limiting Impedance | Resultant Voltage seen by the Load |
|---|---|---|
| 20 | 1.5 | 90 |
| 19 | 1.5 | 91.5 |
| 18 | 1.5 | 93 |
| 17 | 1.5 | 94.5 |
| 16 | 1.5 | 96 |
| 15 | 2 | 90 |
| 14 | 2 | 92 |
| 13 | 2 | 94 |
| 12 | 2 | 96 |
| 11 | 2 | 98 |
| 10 | 3 | 90 |
| 9 | 3 | 93 |
| 8 | 3 | 96 |
| 7 | 4 | 92 |
| 6 | 4 | 96 |
| 5 | 4 | 100 |
| 4 | 7.5 | 90 |
| 3 | 7.5 | 97.5 |
| 2 | 7.5 | 105 |
| 1 | 7.5 | 112.5 |

As will be generally understood, the current drawn by the electrical load 303 generally varies according to the type of load. In one aspect, the resistive element values 426a, 426b, 426c, 426d are generally chosen according to the current draw of the load such that when current inrush remediation is active, the resultant voltage seen by the load remains above 90V. In one aspect illustrated in Table 1, exemplary current draw and resistive element values have been chosen and a voltage seen by the load has been calculated to demonstrate the current inrush limiting process. Accordingly, as the current measuring device 340 monitors the real time current draw of the electrical load 303, the microprocessor 343 selects the appropriate resistive element to insert into the circuit to ensure the voltage seen by the load remains above 90V and current inrush is abated. Further discussion in connection with the process of selecting the proper resistive element will be described in greater detail in connection with FIG. 7.

As will be generally understood, once a current limiting impedance is inserted, the resulting voltage as seen by the load drops due to a voltage drop across the inserted current limiting component following $V_{drop}=I_{load}*R$. In one aspect, the voltage drop varies depending on the current draw of the load. For example, if the current draw prior to a disturbance was 10 amperes and a resistive current limiting device of 7.5 ohms was inserted, the voltage drop across the current limiting device is 75V (10 A*7.5 ohms) resulting in the voltage seen by the load to be 45V (120V-75 V). As previously discussed, for most 120V electrical loads, this results in the load being unintentionally cut off due to an excessive reduction in input voltage.

FIG. 5 illustrates an alternate embodiment of a PPD 110" that utilizes a variable current limiting impedance for remediation of power disturbances in accordance with various systems and methods of the present disclosure. Similar to the embodiment presented in FIGS. 3 and 4, the exemplary embodiment shown in FIG. 5 comprises a current measuring device 112, a voltage measuring device 115, a power supply 344, a microprocessor 343, and an electrical load 303 that generally perform the same functions as the example for FIGS. 3 and 4. The embodiment illustrated in FIG. 5 further comprises a temperature modulated selective current limiting circuit (TMSCILC) 349b.

Additionally and in one aspect, the current limiting impedance 349b comprises an NTC thermistor 526 in series with a switching device R2. In one aspect, the TMSCILC comprises a temperature sensor 545, which is physically positioned adjacent to the NTC thermistor 526 and measures the temperature of the NTC. Further and according to one aspect, the TMSCILC 349b further comprises a current switch 547 that is controlled by the microprocessor 343. In one aspect, the current switch 547 is used to bypass the NTC thermistor 526, such that the NTC thermistor can reduce its temperature by eliminating the current flow through the NTC thermistor.

In one embodiment, the power protection device 110" is a least in part a process executed by the microprocessor 343, wherein the microprocessor is in a monitoring mode where it monitors the input line voltage in order to detect disturbances including, but not limited to voltage sags, overvoltages, undervoltages, momentary interruptions, power outages, etc. Further and according to another aspect, the monitoring mode process also measures the average current draw of the electrical load 303. After initial startup, the switch R1 is closed, connecting the electrical load 303 to input line voltage $V_{IN}$.

According to one aspect, switch R2 of the TMSCILC 349b is open, removing NTC 526 from the circuit. During the monitoring process, once the average current draw of the electrical load 303, $I_{AVE}$, is calculated, the determined value of current limiting resistance, as determined in accordance with the average current draw of the electrical load 303, for the NTC 526 is adjusted by closing current switch 547 and pulling current through NTC 526. As will be generally understood by one of ordinary skill in the art, the NTC thermistor's resistance varies with heat, wherein generally as the NTC heats up it becomes less resistive than at room temperatures or colder temperatures. Accordingly, this characteristic may be exploited by measuring its temperature in order to determine the NTC's resistance. In one aspect, the current switch 547 is manipulated by being steadily turned on or by being pulsed on with an appropriate duty cycle such that the current flows through the NTC 526. Then the NTC is allowed to cool by opening the current switch 547 as to maintain the proper temperature and the corresponding impedance value. Accordingly, pulsing the current switch 547 allows the NTC to heat and cool, which effectively maintains a steady or consistent impedance value. As previously described, the resistance value of NTC 526 is monitored by monitoring the temperature sensor 545. Accordingly, the microprocessor 343 executes program code to provide a process for determining the impedance of the NTC by analyzing the temperature data received from the temperature sensor 545.

According to one aspect, generally, R1 is initially closed allowing the electrical load 303 to be connected to input line voltage 325. The current measuring device 112 340 is read by microprocessor 343 and a target NTC temperature value is determined according to the average current draw of the electrical load 303 and an impedance, which the impedance is determined by the amplitude of the average current draw and heating the NTC 526 to a temperature that will provide the desired impedance. In one aspect, the microprocessor 343 then pulses current switch 547 and pulls current from the input line voltage 325 through switch R1 and NTC 526 to neutral. At the same time, microprocessor 343 monitors the NTC's 526 temperature via a temperature information signal from transmitted from the temperature sensor 545. In one embodiment, using a table stored in microprocessor 343, similar to that of Table 1, the desired resistance value is attained by pulsing current through NTC 526 by pulsing current switch 547 until the desired temperature as read by the microprocessor 343 using temperature sensor 545 is reached.

For example, at room temperature, an NTC 526 suitable for use in an exemplary embodiment may have a value of 10 ohms. During normal operation, the average current drawn by the electrical load 303 is measured at 5 amperes. For the purpose of this exemplary discussion, normal operation typically comprises running without a current limiting impedance mechanism inserted into the supply current path to the electrical load 303. During normal operation, the microprocessor manipulates (e.g., closes and/or opens) the current switch 547 in order to pull current through NTC 526 and then to the load while monitoring the temperature information signal coming from the temperature sensor 545 to the microprocessor 343 in order to set the NTC 526 resistance to 4 ohms. Further, once the NTC reaches the appropriate temperature as determined by the temperature information signal, the microprocessor further manipulates the current switch to maintain the desired temperature correlating to the determined impedance.

Note that while the example presented in FIG. 5 uses a negative temperature coefficient (NTC) thermistor, a positive temperature coefficient thermistor (PTC) may also be used, which as will be understood requires a modification to the process, where in heating there the positive coefficient thermistor (PTC) increases the impedance of the PTC. Therefore, the operative algorithm of the microprocessor would inverse its logic and heat the PTC to increase the impedance.

In one embodiment, the microprocessor 343 controls the operation of the current switch 547, the relays R1 and R2, and receives a temperature information signal form the temperature sensor 545 via communication/control lines 550c, 550, 550b, and 550a respectively. In one aspect, the communications buss 305 could be as simple as a dry relay contact located within the electrical load 303 that changes state when the electrical load 303 is in use. In another aspect, the communications buss 305 could be a higher-level two-way communications buss such as an I2C, USB, SPI, RS232, etc. and the power protection device 110 would then adjust its disturbance detection parameters as described above. In one aspect, the load functioning signal may comprise a binary information signal, wherein one value represents a running state, and the opposite value represents a standby or off state. In another aspect, the load functioning signal may comprise a dynamic signal correlating to various levels of the running state of the electrical load.

FIGS. 6A1 and 6A2 is a flow chart illustrating an exemplary voltage measuring and power disturbance detection process, according to one embodiment of the present disclosure. As previously described in connection with FIG. 3, the voltage measurement device 115 continues to sample and measure the input line voltage $V_{IN}$ for detecting the presence/onset of a power disturbance (e.g., voltage sags, momentary interruptions, overvoltages, undervoltages, and power outages, etc.) and transmits the input line voltage measurements to the microprocessor 343, starting at 601. Further and according to one aspect, typically after the microprocessor identifies the presence of a power disturbance, the microprocessor 343 determines an appropriate remediation (as will be discussed further in connection with FIG. 6C).

At step 602, the microprocessor 343 preferably calculates the average measured voltage, $V_{AVE}$ and uses $V_{AVE}$ to determine the presence of various predetermined power disturbances. Alternatively, instantaneous voltage values could be used for some applications. Accordingly, at step 603, the microprocessor determines the presence/onset of various predetermined power disturbances by comparing the magnitude of $V_{AVE}$ (or instantaneous voltage value if chosen) to the magnitude of an expected overvoltage threshold $V_{THOV}$. Subsequently, the microprocessor 343 determines the presence/onset of an overvoltage by determining if the comparison result at step 603 comprises a $V_{AVE}$ magnitude greater than the OV threshold voltage $V_{THOV}$ magnitude and the greater magnitude of the $V_{AVE}$ has remained relatively consistent for a predetermined amount of time. In one aspect, the predetermined amount of time may comprise any period of time as directed and intended by the PPD 102. For example, the predetermined period may be ¼ of a cycle, many cycles, second, or hours, but typically, a 2 second period is utilized.

If the microprocessor 343 determines an overvoltage event has started, a declaration is made that an overvoltage event has started, as shown in step 607. Accordingly, at step 609, the microprocessor 343 sets a flag corresponding to the overvoltage event data. In one aspect, the flagged overvoltage event data may comprise the last amplitude of the measured input line voltage $V_m$, the amplitude of average measured voltage $V_{AVE}$, the time associated with the start of the overvoltage event, etc.

In one aspect, the microprocessor 343 starts a programmed routine to determine the end of the overvoltage event; hence, the microprocessor continues measuring the input line voltage $V_m$ and calculating the measured average voltage $V_{AVE}$, as shown in step 611. Accordingly, at step 613, the microprocessor determines if the overvoltage has ceased, wherein the microprocessor compares the measured average voltage $V_{AVE}$ to the OV threshold voltage $V_{THOV}$, and determines whether the input line voltage is equal to or below the OV threshold voltage $V_{THOV}$. If the measured average voltage $V_{AVE}$ is equal to or lower than the OV threshold voltage $V_{THOV}$, the microprocessor declares the overvoltage event has ended, as shown in step 615. Alternatively, if the measured average voltage $V_{AVE}$ is not equal to or lower than the threshold voltage $V_{TH}$, the microprocessor continues to measure the input line voltage $V_m$ and calculate the measured average voltage $V_{AVE}$, as shown in step 611 and compares to the OV threshold voltage $V_{THOV}$, as shown in step 613.

Referring back to step 615, after the microprocessor 343 declares the overvoltage event has ended, the microprocessor clears the overvoltage flag with the associated input line voltage data. Subsequently, the microprocessor returns to the measuring input line voltages $V_m$ as shown in step 601.

Refer back to step 605 in FIG. 6A1, wherein the microprocessor 343 determines if the presence/onset of an overvoltage has occurred. If the microprocessor determines that an overvoltage has not occurred, the microprocessor determines if the presence/onset of an undervoltage has occurred by comparing the magnitude of $V_{AVE}$ to the magnitude of the expected undervoltage (UV) voltage threshold $V_{THUV}$. Subsequently, the microprocessor 343 determines the presence/onset of an undervoltage by determining if the comparison result at step 603 comprises a $V_{AVE}$ magnitude less than the UV threshold voltage $V_{THUV}$ magnitude and the lesser magnitude of the $V_{AVE}$ has remained relatively consistent for a predetermined amount of time. In one aspect, as previously descried in connection with determination of an overvoltage, the predetermined amount of time may comprise any period of time as directed and intended by the execution of the PPD 102. For example, the predetermined period may be ¼ of a cycle, many cycles, second, or hours, but typically, a 2 second period is utilized.

If the microprocessor 343 determines that an undervoltage event has started, the microprocessor makes a declaration that an undervoltage event has started, as shown in step 621. Accordingly, at step 623, the microprocessor 343 sets a flag corresponding to the undervoltage event data. In one aspect, the flagged undervoltage event data may comprise the last amplitude of the measured input line voltage $V_m$, the amplitude of average measured voltage $V_{AVE}$, the time associated with the start of the undervoltage event, etc.

In one aspect, the microprocessor 343 starts a programmed routine to determine the end of the undervoltage event; therefore, the microprocessor continues measuring the input line voltage $V_m$ and calculate the measured average voltage $V_{AVE}$, as shown in step 625. Accordingly, at step 627, the microprocessor determines if the undervoltage has ceased, wherein the microprocessor compares the measured average voltage $V_{AVE}$ to the UV threshold voltage $V_{THUV}$, and determines whether the measured average voltage $V_{AVE}$ is equal to or relatively close the UV threshold voltage $V_{THUV}$. If the measured average voltage $V_{AVE}$ is equal to or relatively close to the UV threshold voltage $V_{THUV}$, the microprocessor declares the undervoltage event has ended, as shown in step 629. Alternatively, if the measured average voltage $V_{AVE}$ is not equal to or lower by a predetermined amount than the UV threshold voltage $V_{THUV}$, the microprocessor continues to measure the input line voltage $V_m$ and calculate the measured average voltage $V_{AVE}$, as shown in step 625 and compares $V_{AVE}$ to the UV threshold voltage $V_{THUV}$, as shown in step 627. Referring back to step 629, after the microprocessor 343 declares the undervoltage event has ended, the microprocessor clears the undervoltage flag with the associated input line voltage data. Subsequently, the microprocessor returns to measuring input line voltages $V_m$, as shown in step 601.

Referring back to step 619, wherein the microprocessor 343 determines if the presence/onset of an undervoltage has occurred. If the microprocessor determines that an undervoltage has not occurred, the microprocessor determines if there is the presence/onset of a voltage sag, as shown in step 633 by comparing the magnitude of $V_{AVE}$ to the magnitude of the expected voltage sag (VS) threshold $V_{THVS}$. Subsequently, the microprocessor 343 determines the presence/onset of a voltage sag by determining if the comparison result at step 603 comprises a $V_{AVE}$ magnitude lower than the VS threshold voltage $V_{THVS}$ magnitude and the lower magnitude of the $V_{AVE}$ has remained for a predetermined amount of time. In one aspect, the predetermined amount of time may comprise any period of time as directed and intended by the execution of the PPD 102, typically for detection of a voltage sag, the predetermined amount of time is shorter than the predetermined amount of time for an undervoltage. As previously described, voltage sags are characterized by drops of between 10%-90% of nominal (system) input line voltages. The drops in voltage typically last from a cycle (16.6 millisecond) to a second or so, or tens of milliseconds to hundreds of milliseconds.

If the microprocessor 343 determines a voltage sag event has started, a declaration is made that a voltage sag event has started, as shown in step 635. Accordingly, at step 637, the microprocessor 343 sets a flag corresponding to the voltage sag event data. In one aspect, the flagged voltage sag event data may comprise the last amplitude of the measured input line voltage $V_m$, the amplitude of average measured voltage $V_{AVE}$, the time associated with the start of the voltage sag event, etc.

In one aspect, the microprocessor 343 starts a programmed routine to determine the end the input line voltage $V_m$ and calculate the measured average voltage $V_{AVE}$, as shown in step 639. Accordingly, at step 641, the microprocessor determines if the voltage sag has ceased, wherein the microprocessor compares the measured average voltage $V_{AVE}$ to the threshold voltage $V_{TH}$, and determines whether the measured average voltage is equal to or below the VS threshold voltage $V_{THVS}$. If the measured average voltage $V_{AVE}$ is equal to or marginally lower than the VS threshold voltage $V_{THVS}$, the microprocessor declares the voltage sag event has ended, as shown in step 643. Alternatively, if the measured average voltage $V_{AVE}$ is not equal to or marginally lower than the VS threshold voltage $V_{THVS}$, the microprocessor continues to measure the input line voltage $V_m$ and calculate the measured average voltage $V_{AVE}$, as shown in step 639 and compares $V_{AVE}$ to the VS threshold voltage $V_{THVS}$, as shown in step 641. Referring back to step 641, after the microprocessor 343 declares the voltage sag event has ended (at step 643), the microprocessor clears the voltage sag flag with the associated input line voltage data, as shown in step 645. Subsequently, the microprocessor returns to the measuring input line voltages $V_m$ as shown in step 601.

FIG. 6B is a flow chart illustrating a current measuring process, the determination of current inrushes, and the determination of various operational states 650, according to one embodiment of the present disclosure. As previously described in connection with FIG. 1, the current measuring device 112 samples the input line current and transmits the input line current measurement data to the microprocessor 343, as shown at step 651. Further, the microprocessor determines if a current inrush event has occurred, typically the current inrush will be in response to the starting of an inductive load, but as will be generally understood, a current inrush may be the resulting effect of a voltage sag or other power disturbance recovery. As previously described, during the recovery of power disturbance, electrical loads typically pull a large current inrush in order to re-energize internal components.

As previously described the PPD 102 stores a window of average measured current data $I_{AVE}$, wherein the oldest line current measurement sample is deleted before a new line current measurement sample is stored. Further, the microprocessor 343 typically utilizes the stored average current data $I_{AVE}$ to determine the source of a power disturbance (as will be discussed further in connection with FIGS. 6C and 10). At step 653, the PPD 102 deletes the oldest input line current sample. Subsequently, at step 655, the PPD stores the present (e.g. latest measured) input line current sample in accordance with the previous description.

At step 657, the microprocessor 343 calculates an average measured current $I_{AVE}$, with which the microprocessor typically uses to determine the presence of a current inrush event and an operational state of the electrical load 303. The microprocessor compares the present (e.g. last measured) input line current measurement sample (e.g. (n)) with the previous input line current measurement sample (e.g. (n−1)) to determine the presence of a current inrush event. The comparison of the line current measurement samples generally comprise the microprocessor determining if the present input line current measurement sample (n) is substantially (i.e. approximately greater than 50 times) greater than the previous input line current measurement sample (n−1), as shown in step 659. As previously mentioned, current inrushes for various electrical loads can be 50-500 times that of steady state current draw, whereby the amplitude of the current is much substantially greater than that of normal operation current draw.

As will be generally understood, for the exemplary purposes of the present discussion, n will denote the present or last in time instance of a particular item. Specifically, in this instance, the present or last input line current measurement sample. Likewise, n−1 denotes one instance of a particular item directly preceding the item denoted by n. Specifically, in this instance, n−1 associated with an input current measurement sample denotes the input current measurement sample directly preceding the last input current measure sample n. Accordingly, if the present (e.g. latest measured) input line current measurement sample (e.g. (n)) is substantially greater than the previous input line current measurement sample (e.g. (n−1)), the microprocessor flags the present input line current sample as including a current inrush event, as shown in step 661. Otherwise, if the present (e.g. last measured) input line current measurement sample (e.g. (n)) is not substantially greater than the previous input line current measurement sample (e.g. (n−1)), a current inrush event did not occur and the microprocessor progresses to step 663.

As will be understood, setting a current inrush flag may further comprises storing various data components including, but not limited to time of the current inrush, amplitude of the current inrush, duration of the current inrush, etc. At step 663, the microprocessor makes a further determination of the relationship between the average current measurement $I_{AVE}$ (previously calculated at step 657) and a predetermined current threshold $I_{TH}$, wherein $I_{TH}$ may indicate the status or a predetermined operational state (e.g., running at full capacity, running at 50% capacity, not running, in standby, etc.) of the load. As shown in step 663, the microprocessor determines if the average current measurement $I_{AVE}$ is greater than the predetermined current threshold $I_{TH}$ and if $I_{AVE}$ has been greater than $I_{TH}$ for a predetermined period of time. As will be understood, the predetermined period may comprise any period of time from milliseconds to hours. Accordingly, if the average current measurement $I_{AVE}$ is greater than the predetermined current threshold $I_{TH}$ and if $I_{AVE}$ has been greater than $I_{TH}$ for a predetermined period of time, the microprocessor will declare a predetermined operational state of actively running or the electrical load 303 is in a running state, as shown in step 665. As will be generally understood by one of ordinary skill in the art, $I_{TH}$ does not have to indicate a predetermined operational state of the load, but may dictate some other parameter associated with the present disclosure. Accordingly, utilizing $I_{TH}$ as indicating a predetermined operational state is not intended to limit the spirit or the scope of the present disclosure.

According to an aspect, the microprocessor 343, in response to the declaration of a running state, raises the overvoltage threshold and lowers the undervoltage threshold (as previously described in connection with FIG. 1) to predetermined adjusted overvoltage and undervoltage thresholds, as shown in step 667. As previously discussed in connection with FIG. 1, the PPD 102 via the microprocessor 343 adjusts the overvoltage and undervoltage to provide additional tolerance for the operation of the electrical load so as to provide additional assurance the electrical load will remain operation. Subsequently, the microprocessor continues sampling the input line current, as step 651.

Referring back to step 663, if the microprocessor 343 determines that the average current measurement $I_{AVE}$ is not greater than the predetermined current threshold $I_{TH}$ and/or that $I_{AVE}$ has not been greater than $I_{TH}$ for a predetermined period of time (step 664), the microprocessor further determines if the undervoltage and overvoltage thresholds are adjusted, as shown 679. If, at step 664, the microprocessor determines that the period of time for $I_{AVE}$ to remain less than $I_{TH}$, the microprocessor returns to sampling input line current, as shown in step 651. Referring back to step 679, if the undervoltage and overvoltage thresholds are adjusted, the microprocessor 343 lowers the overvoltage threshold and raises the undervoltage threshold, as shown in 681. In one aspect, the thresholds may return to the original overvoltage and undervoltage thresholds. In another aspect, the overvoltage and undervoltage thresholds may adjust to different predetermined thresholds. Subsequently, the microprocessor 343 continues sampling input line current as shown in step 651. Referring back to step 679, if the undervoltage and overvoltage thresholds are not adjusted, the microprocessor 343 continues sampling the input line current, at step 651. In one embodiment, the overvoltage and undervoltage thresholds may adjust manually to override the overvoltage or undervoltage thresholds such that the electrical load has a higher tolerance of input line voltage fluctuations to reduce unnecessary electrical load trips.

FIG. 6C is a flowchart describing a process for determining appropriate power disturbance remediation measures 680, according to one embodiment of the present disclosure. As previously described, the microprocessor 343 identifies the source of a particular power disturbance presented to the electrical load. Utilizing the identification of the source of a particular power disturbance, the microprocessor determines the appropriate remediation measures to resolve the effects of the particular power disturbance. Further, and according to one aspect of the present disclosure, the microprocessor 343 typically determines the source of the power disturbance, wherein the microprocessor analyzes the average line current measurement. Thus, the process for determining appropriate power disturbance remediation measures 680 typically starts with the line current measuring process 650 discussed in connection with FIG. 6B.

At step 683, the microprocessor 343 determines if an overvoltage or undervoltage flag has been set according to steps 609 and 623 of FIGS. 6A1 and 6A2. Characteristics of overvoltages and undervoltages are described in greater detail in connection with FIGS. 6A1 and 6A2. Accordingly, if an overvoltage or undervoltage flag has been set, the microprocessor 343 will disconnect the electrical load from the input line voltage $V_{in}$, as shown in step 685. Typically, the microprocessor 343 waits for the undervoltage event or the overvoltage event to recover (e.g. a return to nominal voltage range for a predetermined amount of time) prior to reconnecting the load. At step 687, the microprocessor begins a routine of waiting for the undervoltage or overvoltage event to recover. If the overvoltage or undervoltage flag has not cleared, the microprocessor 343 will remain in the overvoltage or undervoltage recovery routine. Alternatively, if the overvoltage or undervoltage flag has cleared (as previously discussed in connection with steps 617 and 631 of FIGS. 6A1 and 6A2), the microprocessor progresses to step 700, wherein various forms of selective current limiting are inserted into the current path so as to limit current inrush upon reconnection of the load. As will be understood, various forms of selective current limiting measures will be discussed in greater detail in connection with FIGS. 7A and 7B.

Refer back to step 683, wherein the microprocessor 343 determines if an overvoltage or undervoltage flag has been set. If an overvoltage or undervoltage flag has not been set, the microprocessor determines if a voltage sag occurred, at step 691. If a voltage sag flag is not set, the microprocessor has not detected one of the various predetermined power disturbances, and the microprocessor begins the process again with the line current measuring process 650. Alternatively and referring back to step 691, if a voltage sag flag is set, the microprocessor 343 determines if a current inrush event occurred prior to the voltage sag to determine the source of the voltage sag.

As previously described and according to one aspect, the microprocessor comprises a timing stamping component, wherein various data (e.g., power disturbance events, current events, input line voltage measurements, input line current, measurements, etc.) is generally stamped with a corresponding time associated with a particular action (e.g., origination, modification, transfer, etc.) of the various data Also, as previously described in connection with step 661 of FIG. 6B, flagging a current inrush event stores a time stamp corresponding to the occurrence of the current inrush event and flagging a voltage sag event stores a time corresponding to the occurrence of the current inrush event.

Thus, at step 692, the microprocessor 343 determines if a current inrush event occurred before the voltage sag by querying the memory of the PPD 102 and locating a proximal current inrush event. If a current inrush event is present, the microprocessor 343 further compares the time associated with the flagged current inrush event to the time associated with the flagged voltage sag event. As previously described, if the current inrush event is present within a predetermined time period prior to the voltage sag, the microprocessor determines the electrical load caused the voltage sag. Therefore, the microprocessor 343 inhibits remediation measures to ensure the input line voltage seen by the load remains above the nominal operating level, as shown in step 693. Further, the microprocessor continues the line current measuring process, as shown in step 650.

Refer back to step 692, wherein the microprocessor 343 determines if there is a current inrush event prior to the voltage sag. If there is not a current inrush event within a predetermined time prior to the voltage sag event, the microprocessor determines that the voltage sag event was due to a power disturbance on the power grid and that appropriate remediation is necessary, e.g. inrush current limiting. At step 700, the microprocessor 343 executes the process for inserting the appropriately selected values of selective current inrush limiting measures (as will be discussed in greater detail in connection with FIGS. 7A and 7B).

Accordingly, at step 695, after the appropriate remediation measures have been executed (process 700) and a current limiting component has been activated, the microprocessor 343 waits a predetermined amount of time before removing the remediation. In one aspect, the wait process allows the current inrush to settle, after which the electrical load 303 is reconnected to the input line voltage 325. In one aspect, the microprocessor 343 may continue to measure the input line voltage to ensure the input line voltage is returned to the nominal voltage for a predetermined period of time before determining to remove the appropriate remediation measures. In another aspect, the microprocessor 343 may continue to measure the input line current to ensure the input line current is returned to a nominal current for a predetermined period of time before determining to remove the appropriate remediation measures. Accordingly, after the microprocessor 343 determines the predetermined amount of time has lapsed, the microprocessor reconnects the bypass switch (as previously described in connection with FIGS. 4 and 5), as shown in step 697. Further, at step 699, the microprocessor removes the selective current inrush limiting measures and the microprocessor continues the line current measuring process (process 650).

FIG. 7A is a flow chart describing a selective current limiting circuit insertion process, wherein the microprocessor 343 switches in a particular selective current inrush limiting mechanism, such as one or more NTCs with a value that is chosen based on the average load current measured just prior to the presence of a power disturbance, according to one embodiment of the present disclosure. As previously described in connection with FIG. 4, a selective current inrush limiting circuit may comprise at least one NTC operatively coupled to a bypass relay. Further, according to the average current measurement at the onset of a power disturbance, the necessary impedance value for limiting current inrush is inserted into the current path for remediation. As previously stated in connection with FIG. 6C, either during the reconnection of the electrical load 303 to the input line voltage or determining a power grid based power disturbance related, current limiting measures will need to be inserted into the current path to remediate the onset of a current inrush event.

Generally, $I_{AVE}$ is calculated during a predetermined window of time beginning prior to the onset of the disturbance, the proper value of current inrush limiting component is selected by closing one or more of the switches R2, R3, R4, or R5 and thus connecting the electrical load 303 to the input line voltage 325 through either a 1.5 ohm, 2 ohm, 3 ohm, 4 ohm, or 7.5 ohm current limiting impedance component. In one aspect, the microprocessor 343 may determine the value of the current limiting impedance component through information relayed via the load functioning signal carried by the communication buss 305. For example, the load functioning signal may carry the average line current measurement data of the electrical load 303, wherein the microprocessor can determine the appropriate value of the current limiting impedance component.

As previously described in connection with Table 1, the varying impedance values are generally used to ensure that after remediation measures are in place, the resultant voltage seen at the electrical load is greater than 90V so as not to starve the electrical load of voltage and inadvertently cause an unintentional cutoff of the electrical load 303. Further, the impedance values are inversely varying according to the current draw of the load, as previously describe in connection with Table. 1. In one aspect, the bypass R1 is presented as an open circuit preventing any current flow through R1. In another aspect, R1 is closed in parallel with the remediation measure.

In one exemplary embodiment at step 701, the microprocessor 343 determines whether $I_{AVE}$ is higher than or equal to 16 amperes (A). Accordingly, if $I_{AVE}$ is greater than or equal to 16 A, the microprocessor inserts a 1.5-ohm current limiting component as shown in step 703. If $I_{AVE}$ is less than 16A, the PPD, at step 705, determines whether $I_{AVE}$ is greater than or equal to 11A. Similarly, at step 707, if $I_{AVE}$ is greater than or equal to 11A, the microprocessor 343 inserts a 2-ohm current limiting component. Alternatively, if $I_{AVE}$ is less than 11A, the microprocessor determines if $I_{AVE}$ is greater than or equal to 8A, as shown in step 709. Similarly, if $I_{AVE}$ is greater than or equal to 8A, the microprocessor, at step 711 inserts a 3-ohm current limiting component. If $I_{AVE}$ is less than 8A, the microprocessor 343 determines whether $I_{AVE}$ is greater than or equal to 5A, at step 713. Similarly, at step 715, if $I_{AVE}$ is greater than or equal to 5A, the microprocessor 343 inserts a 4-ohm current limiting component. Further, if $I_{AVE}$ is less than 5A, the microprocessor inserts a 7.5-ohm current limiting component, as shown in step 717. In one aspect, a delay time for the current limiting impedance to be inserted is between 1 and 10 AC line cycles, but as will be generally understood by one skilled in the art, the time delay may be up to 2 seconds or longer if necessary.

According to one aspect, as the microprocessor 343 continues to receive the average input current measurement data from the current measurement device 115, the value of the appropriate impedance for remediation may change so as to maintain the voltage at a level within the nominal operating range. Accordingly, the microprocessor 343 dynamically modifies the value of the inserted impedance according to the received average input current data. Further and as will be generally understood by one skilled in the art, the process illustrated in FIG. 7A comprises one resistive path chosen by closing only one of the switches R2, R3, R4, or R5 and additional values of current limiting impedances could be achieved by closing more than one of the switches R2, R3, R4, or R5 simultaneously. For example, inserting both a 3-ohm current limiting impedance in parallel with a 4 ohm current limiting impedance would result in a current limiting impedance of 1.7 ohms. Therefore, this would negate the need for the circuit to comprise a discrete 1.5-ohm and 2-ohm current limiting mechanism option, which results in a cost reduction of 2 switching devices as well as 2 current limiting impedances. As will be generally understood by one of ordinary skill in the art, the impedance values, current values, and voltage values are for exemplary purposes only and are not intended to limit the spirit or the scope of the present disclosure.

FIG. 7B is a flow chart describing a selective current limiting circuit insertion process, wherein the microprocessor 343 switches in a particular selective current inrush limiting mechanism, according to one embodiment of the present disclosure. As previously described in connection with FIG. 5, a temperature modulated selective current limiting circuit typically comprises an NTC with an impedance value inversely varying with changing temperature, wherein the impedance value lowers as the temperature of the NTC temperature raises. Accordingly, the temperature of the NTC can be modulated by passing current through the NTC to obtain a particular impedance value of the NTC. Further, the NTC may be inserted into the current path of the temperature modulated selective current limiting circuit.

As will be described further in connection with FIG. 7C, the temperature of the NTC is predetermined according to the measured current drawn by the load. Accordingly, the microprocessor 343 sets the temperature of the NTC as the electrical load is drawing current, such that the NTC is ready to be inserted when selective current inrush limiting measures are determined to be an appropriate action. Subsequently, as shown in FIG. 7B, at step 743, the microprocessor closes R2 and inserts the NTC into the current path of the electrical load according to step 700 of FIG. 6C.

FIG. 7C is a flow chart illustrating an NTC temperature modulation process, wherein the microprocessor modulates the NTC temperature according to the average current drawn by the electrical load 303. According to one embodiment of the present disclosure, the temperature modulated selective current limiting circuit performs real-time modulation of the NTC temperature according to the average current drawn by the load. As will be generally understood, the microprocessor correlates the temperature of the NTC with the impedance determined appropriate by the microprocessor for current inrush remediation. In one aspect, the microprocessor modulates the NTC temperature while the load is running such that if the microprocessor determines that selective current inrush limiting measures are necessary, the NTC is ready for insertion into the current path of the electrical load.

At step 731, the microprocessor 343, utilizing the average input line current measurement data at the time of the presence of the event, correlates a matching NTC 526 impedance and temperature to remediate the onset of a current inrush. Accordingly, the microprocessor 343 closes the current switch 547 to heat the NTC 526 to the temperature that corresponds to the necessary impedance, as shown in step 733. At step 735, the microprocessor 343 measures the NTC temperature via the temperature sensor 545 and determines if the measured NTC temperature is greater than the predetermined temperature, as shown in step 737. If the measured NTC temperature is greater than the predetermined temperature, the microprocessor, at step 739, opens the current switch 547 and allows the NTC to cool, which raises the NTC's temperature (as previously discussed in connection with FIG. 5). Further, the microprocessor 343 continues measuring the NTC temperature, back at step 735, attempting to attain the proper NTC temperature for current inrush remediation.

Refer back to step 737, wherein the microprocessor 343 determines if the measured NTC temperature is greater than the predetermined temperature identified by the microprocessor. If the measured NTC temperature is not greater than the predetermined temperature, the microprocessor progresses to step 741. At step 741, the microprocessor determines if the measured NTC temperature is less than the predetermined temperature. If the measured NTC temperature is less than the predetermined temperature, the microprocessor closes and/or keeps close the current switch 547, which allows the current to pass through the NTC. Alternatively, if the measured NTC temperature is not less than the predetermined temperature and at the previous step 737 and it was determined that the measured NTC temperature was not more than the predetermined temperature, then the NTC is at the necessary temperature. Further, the microprocessor 343 progresses back to step 735 to monitor the temperature of the NTC. Further, the microprocessor continues steps 735-741 to ensure the temperature of the NTC remains at a temperature corresponding to an impedance determined by the microprocessor for remediating a current inrush event. According to one aspect, the make-before-break switching protocol may be utilized and/or switching out the additional current limiting impedances should be executed at an AC cycle zero crossing to ensure longer switch life.

DISCUSSION EXAMPLES

FIGS. 8 and 9 further illustrate alternate scenarios and embodiments involving the determination of an operative state of an exemplary load (e.g., a mass production color printer 120 and/or a soda machine 1010) corresponding to a power disturbance source identification and appropriate related remediation of the associated power disturbance. According to certain embodiments and as previously discussed, the power protection device (PPD) 110 generally comprises various mechanisms to remediate predetermined power disturbances, inhibit remediation according to predetermined parameters, and/or adjust various thresholds to protect operation of critical equipment.

As previously described, the scenario in connection with FIG. 1 described detection of a power disturbance, identifying the source of the power disturbance was the power grid, and remediating the power disturbance from the power grid. The scenario depicted in FIG. 8 differs from the scenario depicted in FIG. 1 such that in FIG. 8, the source of the power disturbance is an electrical load fed from the branch circuit. Since the power disturbance source is branch circuit based, the PPD 110 overrides the current limiting measures and inhibits current event remediation. Further, in the FIG. 8 scenario the electrical load is a more inductive electrical load (e.g. soda machine with a refrigeration compressor) than the electrical load of the FIG. 1 scenario.

In various aspects and as previously described, the instance where a voltage sag precedes or leads the current inrush, remediation by inserting current limiting circuitry in series with the electrical load 303 is desired. Accordingly, the voltage sag or momentary interruption leads the current inrush in the time domain. However, there are cases where the voltage sag or momentary interruption lags or follows the current inrush. For example, an electrical load such as a refrigeration compressor or electric motor may be located on a branch circuit with a very long run of wire between the breaker panel and service outlet. The long run of wire presents an electrical impedance within the circuit and generally, standard 14 gauge electrical wiring is used for 15 ampere 120 volt electrical service has a resistance of 2.9495 ohms of resistance and 0.058 ohms of reactance per 1000 feet at 60 Hz. On a 75 foot run, if the maximum 15 amperes were being drawn steadily on a 120V AC branch circuit, the voltage presented to the load would be 114V due to the wire's inherent impedance causing a V=I*R voltage drop.

For inductive loads such as refrigeration compressors seen in soda machines or motor driven devices, the current draw at startup is appreciably higher than their steady state current draw. Instantaneous current draws at start up for inductive loads vary from device to device and can be from 50 to 500 times that of its steady state current draw after startup. Standard electrical panel circuit breakers require the over-current that triggers a trip to sustain for a certain period of time. If inductive load instantaneous current inrush at startup is below the over-current time period of standard breakers, a circuit breaker trip at inductive load start up generally does not occur. However, in such cases, while the circuit breaker does not trip, the branch circuit does experience a local voltage sag. While a grid-generated voltage sag is presented to an electrical load, a local voltage sag is caused by one of the electrical loads on a branch circuit. This presents a problem to a power protection device that reacts to voltage sags as a means to predict a current inrush. If an inductive load starts up and a local voltage sag is produced, the power protection device senses this local voltage sag and inserts current inrush limiting protective remediation. This not only limits the current required by the electrical load device to start up, but it adds an additional V=I*R voltage drop across its current inrush limiting component thus reducing the voltage presented to the electrical load. The combination of current limiting and voltage level reduction may cause the electrical load to be deprived of enough electrical power to start or may cause other undesirable effects such as causing circuit breakers or other power protection measures to unexpectedly trip, etc.

FIG. 8 illustrates a power protection device (PPD) in an exemplary environment, constructed and operated in accordance with various aspects of the present disclosure. This particular scenario involves an operative state of a different exemplary inductive load (e.g., a soda machine 810 with a refrigeration compressor) corresponding to power disturbance source identification and appropriate related remediation of the associated power disturbance. FIG. 8 is a discussion example in accordance with the aforementioned embodiments with an exemplary inductive load such as a motor or refrigeration compressor. In this exemplary scenario, a power protection device 110 is coupled to an exemplary soda machine 810, and is coupled to an input AC power source (e.g. power line 100).

Assume for the example of FIG. 8 that the PPD 110 comprises an overvoltage threshold of 140V and an undervoltage threshold of 95V, wherein some form of remediation will be invoked if the input voltage amplitude is outside of the range of the thresholds. The PPD 110 continuously monitors and records the average current draw of the load and marks various predetermined events (e.g., current inrush events, over threshold current draws, and current anomalies). In certain instances and as previously described in connection with FIGS. 1 and 8, the PPD 110 may adjust the overvoltage or undervoltage thresholds according to various parameters indicative of load operating state.

The PPD 110 also monitors voltages supplied to the load to identify various predetermined events (e.g., voltage sag, momentary power outage, power disruption, undervoltage, overvoltage, etc.)—analyzes the relationship between the supply voltage and the load current—to determine the source of the occasion or power disturbance. Further, the PPD determines whether to remediate the power disturbance or to inhibit remediation because the power disturbance is not significant to the operation of the load or remediation may impact operation of the load.

Still referring to FIG. 8, a particular sequence of events in this exemplary scenario is illustrated sequentially as numbered circles. Starting at step 1, a power protection device (PPD) 110 comprising a current measuring device 112 is coupled to an electrical load and an input voltage source 100. In this specific exemplary scenario, assume the electrical load comprises a soda machine 810 with a refrigeration compressor, which is a predominantly inductive load. As will be generally understood by one of ordinary skill in the art, variations in the electrical load current may be due to not only differing connected equipment, but also different modes of operation within the same piece of equipment. As previously described, in connection with some industrial equipment, current inrushes can reach levels up to 50-500 times of the rated steady-state line current.

Assume the current measuring device 112 of the PPD is monitoring the average current, $I_{AVE}$, draw of the load 815. As illustrated in FIG. 8, around the time of t=2.5, a current inrush is detected. In this scenario, assume that when the refrigeration motor within the soda machine starts cooling the interior of the machine, the current monitoring apparatus 340 of the PPD 110 will detect an accompanying current inrush. Assume that the current threshold $I_{TH}$ of 9 A is the typical current draw when the refrigeration mechanism is off.

At step 2, the PPD continuously monitors the line voltage 130 for various predetermined events. Assume that events generally comprise various power disturbances such as a voltage sag, a momentary power outage, a power disruption, an undervoltage, an overvoltage, etc. As shown in step 2, during the monitoring process it is shown that a voltage sag occurs near t=3 for the line voltage supplied to the soda machine 810 as illustrated in the line voltage $V_{in}$ monitoring 1020. At step 3, the PPD compares the times of current inrush and the voltage sag to determine which event preceded the other. In this scenario, the PPD 110 subtracts the time associated with the current inrush (t=2.5) from the time associated with the voltage sag (t=3.0) and determines that the current inrush preceded the voltage sag 825. As will be generally understood by one of ordinary skill in the art, the aforementioned method of determining which event occurred first is used for illustrative and exemplary purposes only and is not intended to limit the spirit or scope of the present disclosure. Further, there may be many different processes for determining which event occurred first.

Accordingly, the PPD determines whether the source of the voltage sag is from the current inrush of the soda machine 810 in connection with the start of the refrigeration compressor motor. Therefore and according to certain aspects, the voltage sag was due to the electrical load 303 within in the branch circuit and does not require current limiting remediation. At step 4, the PPD determines that remediation is not required and inhibits remediation 830.

FIG. 9 illustrates the voltage and current characteristic comparison (step 3 in FIG. 8) in connection with the discussion example of FIG. 8. As discussed, in step 3 of FIG. 10, the PPD 110 compares the presence of current inrush prior to the onset of the power disturbance (e.g. voltage sag) within the time domain. Accordingly, FIG. 9 is an illustrative representation of the voltage and current waveform characteristic relationship to identify the presence of a current event (e.g., current inrush, increase in current draw, etc.), wherein the presence of the current inrush or increase in current draw may determine that the power disturbance was caused by an electrical load fed from the branch circuit. If a current event is present, the PPD further determines where the current inrush resides within the time domain in comparison with a power disturbance such as an undervoltage, overvoltage, voltage sag, etc.

As shown at numbered circle 1 of FIG. 9, the average current $I_{AVE}$ and measured voltage $V_{Md}$ are as typical sine waves. Assume and as illustrated, the average current, $I_{AVE}$ is trending within the indicated threshold current 905, correlating with step 1 of FIG. 8. Further, at numbered circle 1 of FIG. 9, the measured voltage is within the expected voltage threshold 910, indicating a generally normal steady state of the exemplary soda machine 810.

The numbered circle 2 of FIG. 9 identifies an onset of a voltage sag, wherein the measured voltage level is trending lower than the expected voltage threshold 910. Further, the $I_{AVE}$ comprises a current inrush occurrence indicating the starting of the refrigeration compressor motor within the soda machine 810. According to various embodiments of the present disclosure, the PPD processes and determines the position and events of voltage and current parameters to determine various predetermined conditions. For example and as illustrated in FIG. 9, a voltage sag soon following a current inrush in the time domain typically indicates a power disturbance within the branch circuit and generally does not necessitate power disturbance or current limiting remediation.

The foregoing is merely illustrative of the principles of the disclosure, and the systems, devices, and methods can be practiced by other than the described embodiments, which are presented for purposes of illustration and not of limitation. The embodiments and features herein are described generally relate to systems and methods for efficiently remediating an undesirable input power voltage due to a power disturbance. According to one embodiment, the power protection device (PPD) determines the operational state of an electrical load device being protected by the power protection device in order to make a determination if remediation as a response to a power disturbance should be inhibited. In one embodiment, the operational state of the electrical load device is determined by use of a current measuring device that monitors the current draw of the electric load. In one embodiment, the PPD 110 may relax the disturbance detection parameters or inhibit remediation according to predetermined load state to ensure that the load maintains proper functionality. In another embodiment, the PPD may remediate the power disturbance according to a load state and/or line voltage condition. Further and according to another aspect, the PPD may remediate a power disturbance according to a load current anomaly and/or line voltage conditions. In further embodiments, aspects of the PPD generally enable the system to determine whether the source of the voltage disturbance is due to load operations or if the source of the voltage disturbance is from the power grid. Generally, the source of a voltage disturbance will dictate the execution and/or inhibition of remediation.

In one embodiment, the PPD comprises a selective current inrush limiting apparatus, wherein various impedance mechanisms are inserted into the voltage and current path to the load according to the current draw of an electrical load device operation as measured by current measuring device 112. In one aspect, multiple impedance paths are connected in parallel to allow a microprocessor to choose the proper current limiting impedance value based on the current draw of the electrical load device prior to the onset of a voltage sag or other power interruption that can cause a current inrush at the point of voltage recovery.

It will be understood that various embodiments of the present system described herein may be implemented as a special purpose or general-purpose computer including various computer hardware as discussed in greater detail below. Embodiments within the scope of the present disclosure also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multiprocessor systems, microprocessor-based or programmable consumer electronics, networked PCs, minicomputers, mainframe computers, and the like. The invention is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The computer, e.g. microprocessor, that effects some aspects of the inventions may operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote memory storage device. It will be appreciated that the network connections described or shown are exemplary and other mechanisms of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernible from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence (s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. Apparatus for selective protection of an electrical load from disturbances on an input power line in response to characteristics of the electrical load, comprising:
    a power protection circuit coupled to the input power line for providing electrical protection for the load in response to a control circuit, the power protection circuit including an inrush current limiting circuit and a switch for disconnecting the input power line from the load; and
    a control circuit coupled to the power protection circuit for providing remediation and/or inhibition of remediation, the control circuit operative for:
        (a) determining that the electrical load is in a first operational state corresponding to a first average current draw over a first predetermined time period, or a second operational state corresponding to a second average current draw over a predetermined second time period;
        (b) controlling the power protection circuit to provide inrush current limiting to the electrical load in response to a first category of disturbances when the electrical load is in the first operational state; and
        (c) inhibiting the power protection circuit from disconnecting the electrical load in response to a second category of disturbances when the electrical load is in the second operational state.

2. The apparatus of claim 1, wherein the first operational state corresponds to a standby state of a machine that is the electrical load wherein the machine is drawing a nominal quiescent load, and the second operational state corresponds to a substantially full operation wherein the machine is drawing its full rated current.

3. The apparatus of claim 1, wherein the second operational state corresponds to a state of operation when the average current drawn by the load exceeds a predetermined threshold value for a predetermined time period.

4. The apparatus of claim 1, wherein the control circuit is coupled to receive a load functioning signal from the electrical load, and wherein the determination of first and second operational states is made at least in part as a function of the load functioning signal.

5. The apparatus of claim 4, wherein the load functioning signal comprises a signal indicating that the load is either in the first operational state or the second operational state.

6. The apparatus of claim 4, wherein the load functioning signal comprises a signal that numerically varies in accordance with the operations of the load, and wherein the control circuit determines the operational state as a function of the value of the load functioning signal.

7. The apparatus of claim 1, wherein the first category of disturbances is selected from the group: (a) voltage sag, (b) undervoltage condition, (c) power outage.

8. The apparatus of claim 1, wherein the second category of disturbances is selected from the group: (a) an overvoltage condition that does not exceed a first predetermined overvoltage threshold, (b) an undervoltage condition that does not fall below a first predetermined undervoltage threshold, (c) a voltage sag that does not fall below a first predetermined voltage sag threshold for a predetermined time period.

9. The apparatus of claim 1, wherein the characteristics of the electrical load comprise a measurement of the average current drawn by the electrical load during a predetermined measurement interval corresponding to the predetermined first and second time periods.

10. The apparatus of claim 1, wherein the inrush current limiting circuit is a selectively variable inrush current limiting circuit, and wherein the control circuit is further operative for providing a selectively variable inrush current limiting impedance as a function of the average current drawn by the electrical load during a predetermined third time period.

11. The apparatus of claim 10, wherein the selectively variable inrush current limiting circuit comprises a parallel arrangement of selectably switchable impedance devices having different impedance values coupled between the input power line and the electrical load that are switched by the control circuit to provide a selected impedance value.

12. The apparatus of claim 11, wherein the selectably switchable impedance devices comprise negative temperature coefficient (NTC) thermistors.

13. The apparatus of claim 10, wherein the control circuit is a microprocessor that executes computer program code to (a) store a list of current draw values associated with the electrical load that vary inversely to particular values of current limiting impedances connected in parallel that can be selectively coupled between the input power line and the load, and (b) control the selection of particular ones of the current limiting impedances as a function of a measurement of a current draw so as to impose a determined net impedance value for resisting inrush current that maintains a resultant voltage seen by the electrical load within a predetermined nominal operating range of voltage values.

14. The apparatus of claim 13, wherein the current draw values ranges from between 1 ampere and 20 amperes, and wherein the parallel current limiting impedances are selected from 1.5, 2, 3, 4, and 7.5 ohms, and wherein the resultant voltage seen by the electrical load varies from about 90 volts to about 112.5 volts.

15. The apparatus of claim 10, wherein the selectively variable inrush current limiting circuit comprises a temperature modulated resistive circuit coupled between the input power line and the electrical load.

16. The apparatus of claim 15, wherein the temperature modulated circuit comprises:
a negative temperature coefficient (NTC) thermistor that is (a) coupled between the input power line and the electrical load, (b) in parallel with a temperature control switch that is coupled between an input terminal of the NTC thermistor and a power return line;
a temperature sensing device positioned in close proximity to the NTC thermistor so as to measure the temperature of the NTC thermistor and provide a temperature measurement signal to the control circuit; and
wherein the control circuit is responsive to the temperature measurement signal to actuate the temperature control switch to route current through the NTC thermistor in a varying duty cycle so as to control the temperature of the NTC thermistor and thereby vary the resistance of the NTC thermistor.

17. The apparatus of claim 1, further comprising a voltage measurement device for providing voltage measurement signals to the control circuit for detecting disturbances on the input power line, and a current measurement device for providing current measurement signals for determining characteristics of the electrical load.

18. The apparatus of claim 1, wherein the second category of disturbances comprises an overvoltage condition exceeding a predetermined overvoltage threshold for a predetermined time period,
wherein the control circuit is operative to disconnect the electrical load from the input power line in response to the occurrence of the overvoltage condition, and
wherein the control circuit is operative to adjust the predetermined overvoltage threshold to a value higher than a nominal value in response to the second operational state.

19. The apparatus of claim 18, wherein the control circuit is operative to return the predetermined overvoltage threshold to the nominal value in response to ending of the second operational state.

20. The apparatus of claim 1, wherein the second category of disturbances comprises an undervoltage condition below a predetermined undervoltage threshold for a predetermined time period,
wherein the control circuit is operative to disconnect the electrical load from the input power line in response to the occurrence of the undervoltage condition, and
wherein the control circuit is operative to adjust the predetermined undervoltage threshold to a value lower than a nominal value in response to the second operational state.

21. The apparatus of claim 20, wherein the control circuit is operative to return the predetermined undervoltage threshold to the nominal value in response to ending of the second operational state.

22. The apparatus of claim 17, wherein the second category of disturbances comprises a voltage sag condition persisting for a predetermined time period,
wherein the control circuit is operative to provide inrush current limiting to the electrical load from the input power line in response to the occurrence of the voltage sag condition, and
wherein the control circuit is further operative to provide a selectively variable inrush current limiting impedance for the electrical load in response to the second operational state.

23. The apparatus of claim 1, wherein the first category of disturbances comprises an inrush current event wherein the current to the electrical load exceeds a predetermined inrush current threshold,
wherein the control circuit provides inrush current limiting in response to the occurrence of an undervoltage condition or a voltage sag condition occurring prior in time to an inrush current event, and
wherein the control circuit controls the amount of inrush current limiting in response to the occurrence of an inrush current event occurring prior in time to an undervoltage condition or a voltage sag condition.

24. The apparatus of claim 23, wherein the inrush current event is further characterized by a current average comprising a measurement of the current to the electrical load exceeding the predetermined inrush current threshold for a predetermined time duration, and wherein the determination of the time of occurrence of the disturbance relative to the inrush current event is made based on the value of the current average relative to the occurrence of the undervoltage condition or the voltage sag event.

25. A method for selective protection of an electrical load from disturbances on an input power line in response to characteristics of the electrical load, comprising the steps of:
providing a power protection circuit coupled to the input power line for providing electrical protection for the electrical load, the power protection circuit including an inrush current limiting circuit and a switch for disconnecting the input power line from the load;
providing remediation and/or inhibition of remediation with the power protection circuit in response to predetermined conditions, said remediation comprising:
(a) determining that the electrical load is in a first operational state corresponding to a first average current draw over a first predetermined time period, or a second operational state corresponding to a second average current draw over a predetermined second time period;

(b) controlling the power protection circuit to provide inrush current limiting to the electrical load in response to a first category of disturbances when the electrical load is in the first operational state; and (c) inhibiting the power protection circuit from disconnecting the electrical load in response to a second category of disturbances when the electrical load is in the second operational state.

26. The method of claim 25, wherein the method is tied to a machine comprising a power protection circuit coupled to the input power line for providing electrical protection for the electrical load in response to control signals from a control circuit, the power protection circuit including an inrush current limiting circuit and a switch for disconnecting the input power line from the load; and a control circuit coupled to the power protection circuit.

27. The method of claim 25, wherein the first operational state corresponds to a standby state of a machine that is the electrical load wherein the machine is drawing a nominal quiescent load, and the second operational state corresponds to a substantially full operation wherein the machine is drawing its full rated current.

28. The method of claim 25, wherein the second operational state corresponds to a state of operation when the average current drawn by the load exceeds a predetermined threshold value for a predetermined time period.

29. The method of claim 25, further comprising the step of determining the first and second operational states at least in part as a function of a load functioning signal from the electrical load.

30. The method of claim 29, wherein the load functioning signal comprises a signal indicating that the load is either in the first operational state or the second operational state.

31. The method of claim 29, wherein the load functioning signal comprises a signal that numerically varies in accordance with the operations of the load, and wherein the control circuit determines the operational state as a function of the value of the load functioning signal.

32. The method of claim 25, wherein the first category of disturbances is selected from the group: (a) voltage sag, (b) undervoltage condition, (c) power outage.

33. The method of claim 25, wherein the second category of disturbances is selected from the group: (a) an overvoltage condition that does not exceed a first predetermined overvoltage threshold, (b) an undervoltage condition that does not fall below a first predetermined undervoltage threshold, (c) a voltage sag that does not fall below a first predetermined voltage sag threshold for a predetermined time period.

34. The method of claim 25, wherein the characteristics of the electrical load comprise a measurement of the average current drawn by the electrical load during a predetermined measurement interval corresponding to the predetermined first and second time periods.

35. The method of claim 25, further comprising the step of providing a selectively variable inrush current limiting impedance as a function of the average current drawn by the electrical load during a predetermined third time period.

36. The method of claim 35, wherein the selectively variable inrush current limiting impedance comprises a parallel arrangement of selectably switchable impedance devices having different impedance values coupled between the input power line and the electrical load that are switched by the control circuit to provide a selected impedance value.

37. The method of claim 36, wherein the selectably switchable impedance devices comprise negative temperature coefficient (NTC) thermistors.

38. The method of claim 35, wherein the method is effected at least in part by a programmed microprocessor that executes computer program code to (a) store a list of current draw values associated with the electrical load that vary inversely to particular values of current limiting impedances connected in parallel that can be selectively coupled between the input power line and the load, and (b) control the selection of particular ones of the current limiting impedances as a function of a measurement of a current draw so as to impose a determined net impedance value for resisting inrush current that maintains a resultant voltage seen by the electrical load within a predetermined nominal operating range of voltage values.

39. The method of claim 38, wherein the current draw values ranges from between 1 ampere and 20 amperes, and wherein the parallel current limiting impedances are selected from 1.5, 2, 3, 4, and 7.5 ohms, and wherein the resultant voltage seen by the electrical load varies from about 90 volts to about 112.5 volts.

40. The method of claim 35, wherein the selectively variable inrush current limiting impedance comprises a temperature modulated resistive circuit coupled between the input power line and the electrical load.

41. The method of claim 40, wherein the temperature modulated circuit comprises:

a negative temperature coefficient (NTC) thermistor that is (a) coupled between the input power line and the electrical load, (b) in parallel with a temperature control switch that is coupled between an input terminal of the NTC thermistor and a power return line;

a temperature sensing device positioned in close proximity to the NTC thermistor so as to measure the temperature of the NTC thermistor and provide a temperature measurement signal to the control circuit; and wherein a control circuit is responsive to the temperature measurement signal to actuate the temperature control switch to route current through the NTC thermistor in a varying duty cycle so as to control the temperature of the NTC thermistor and thereby vary the resistance of the NTC thermistor.

42. The method of claim 25, wherein disturbances on the input power line are detected based on voltage measurement signals, and characteristics of the electrical load are based on current measurement signals of the electrical load.

43. The method of claim 42, wherein the second category of disturbances comprises an overvoltage condition exceeding a predetermined overvoltage threshold for a predetermined time period, and further comprising the steps of:

disconnecting the electrical load from the input power line in response to the occurrence of the overvoltage condition, and adjusting the predetermined overvoltage threshold to a value higher than a nominal value in response to the second operational state.

44. The method of claim 43, further comprising the step of returning the predetermined overvoltage threshold to the nominal value in response to ending of the second operational state.

45. The method of claim 42, wherein the second category of disturbances comprises an undervoltage condition below a predetermined undervoltage threshold for a predetermined time period, and further comprising the steps of:

disconnecting the electrical load from the input power line in response to the occurrence of the undervoltage condition, and adjusting the predetermined undervoltage threshold to a value lower than a nominal value in response to the second operational state.

46. The method of claim 45, further comprising the step of returning the predetermined undervoltage threshold to the nominal value in response to ending of the second operational state.

47. The method of claim 42, wherein the second category of disturbances comprises a voltage sag condition persisting for a predetermined time period, and further comprising the steps of:

providing inrush current limiting to the electrical load from the input power line in response to the occurrence of the voltage sag condition, and providing a selectively variable inrush current limiting impedance for the electrical load in response to the second operational state.

48. The method of claim 25, wherein the first category of disturbances comprises an inrush current event wherein the current to the electrical load exceeds a predetermined inrush current threshold, and further comprising the steps of:

providing inrush current limiting in response to the occurrence of an undervoltage condition or a voltage sag condition occurring prior in time to an inrush current event, and providing inrush current limiting in response to the occurrence of an inrush current event occurring prior in time to an undervoltage condition or a voltage sag condition.

49. The method of claim 48, wherein the inrush current event is further characterized by a current average comprising a measurement of the current to the electrical load exceeding the predetermined inrush current threshold for a predetermined time duration, and wherein the determination of the time of occurrence of the disturbance relative to the inrush current event is made based on the value of the current average relative to the occurrence of the undervoltage condition or the voltage sag event.

50. Apparatus for selective protection of an electrical load from disturbances on an input power line in response to characteristics of the electrical load, comprising:

a power protection circuit coupled to the input power line for providing electrical protection for the electrical load in response to control signals from a control circuit, the power protection circuit including an selectively variable inrush current limiting circuit and a switch for disconnecting the input power line from the load;

a current measuring device coupled to the input power line for measuring current being provided through the power protection circuit to the electrical load and for providing current measurement signals;

a voltage measuring device coupled to the input power line for measuring the voltage applied through the power protection circuit to the electrical load and for providing voltage measurement signals; and a control circuit coupled to the current measuring device and the voltage measuring device for receiving the voltage measurement signals and the current measurement signals, the control circuit operative for:

(a) disconnecting the electrical load from the input power voltage in response to determination from the voltage measurement signals of a disturbance comprising an overvoltage (OV) condition on the input power line as compared to a predetermined OV threshold;

(b) as a function of the current measurement signals and the relative time relationship between the disturbance and current drawn by the load during normal operation of the load, controlling the selectively variable inrush current limiting device to reduce inrush current resulting from the ending of a disturbance; and (c) reconnecting the load to the input power line through the inrush current limiting device in response to detection of the end of a disturbance.

51. The apparatus of claim 50, wherein the relative time relationship between the disturbance and current drawn comprises an inrush current occurring prior in time to a voltage disturbance.

52. The apparatus of claim 50, wherein the control circuit is further operative for disconnecting the electrical load from the input power voltage in response to determination from the voltage measurement signals of a disturbance comprising an undervoltage (UV) condition on the input power line as compared to a predetermined UV threshold.

53. The apparatus of claim 50, wherein the control circuit is further operative for disconnecting the electrical load from the input power voltage in response to determination from the voltage measurement signals of a disturbance comprising a voltage sag condition on the input power line.

54. The apparatus of claim 50, wherein the control circuit is operative for determining whether the electrical load is in an operative state in which disconnecting the load is to be inhibited.

55. The apparatus of claim 54, wherein the control circuit is further operative for determining whether the load is in a first operative state or a second operative state as determined by an average of the current measurement signals over a predetermined period of time.

56. The apparatus of claim 55, wherein the control circuit is further operative to adjust the predetermined OV threshold in response to a determination that the electrical load is in a first operative state or a second operative state.

57. The apparatus of claim 50, wherein the control circuit is operative for controlling the inrush current limiting circuit as a function of the current measurement signals.

58. The apparatus of claim 50, wherein the control circuit is further operative for:

(a) calculating a historical current usage parameter of the electrical load based on the current measurement signals over a predetermined time period during normal operation of the electrical load drawing current from the input power line;

(b) based on the historical current usage parameter, setting a current threshold value corresponding to an expected current draw for the electrical load during a first state corresponding to normal operations;

(c) determining, from the current measurement signals as compared to the current threshold that the electrical load is in a second state corresponding to a current draw exceeding that of normal operations;

(d) determining from the voltage measurement signals at a predetermined point in time, the occurrence of a voltage disturbance experienced by the electrical load;

(e) in response to a determination of the occurrence of a voltage disturbance at the predetermined point in time, determining, from the current measurement signals measured prior to the predetermined point in time, whether an inrush current to the electrical load occurred prior to occurrence of the voltage disturbance; and (f) in response to determination that an inrush current to the electrical load occurred prior to occurrence of the voltage disturbance, inhibiting the operation of the power protection circuit if the load is in the second state.

59. The apparatus of claim 58, wherein the inhibiting the operation of the power protection circuit continues until the load returns to the normal state.

60. The apparatus of claim 50, wherein the selective protection of the electrical load comprises one or more of the following: selective reduction of inrush current to the electrical load, selective disconnection of the input power voltage from the electrical load, selective connection of varied impedance values between the input power voltage and the electrical load, selective adjustment of electrical parameters used in determining selection of impedance values and/or disconnection of the electrical load, selective overriding of a protection function.

61. The apparatus of claim 50, wherein the historical current usage parameter of the current measurement signals comprises a running average current value over a predetermined time period.

62. The apparatus of claim 50, wherein the running average is calculated over a predetermined time period selected from the group: a plurality of AC voltage cycles, a time period of milliseconds, a time period of second, a time period of minutes, a time period of hours.

63. The apparatus of claim 50, wherein normal operation of the electrical load comprises a predetermined time period in which the electrical load is operating to draw the maximum current expected for full capacity of the load for its intended purpose.

64. The apparatus of claim 63, wherein the electrical protection comprises an inrush current impedance coupled between the input power line and the load.

65. The apparatus of claim 64, wherein the inrush current impedance comprises selectively insertable impedances that are switched into the circuit by the control circuit.

66. The apparatus of claim 65, wherein the selectively insertable impedances comprise a parallel arrangement of thermistors connected in series with a switch that is actuated by the control circuit.

67. The apparatus of claim 66, wherein the thermistors are negative temperature coefficient (NTC) devices.

68. The apparatus of claim 64, wherein the inrush current impedance comprises a plurality of selectable impedances that are selectable by the control circuit to provide a varying impedance that increases inversely to the current drawn by the load.

69. The apparatus of claim 68, wherein the impedances are selected so as to maintain a voltage level at the load that is within a predetermined nominal operating range for the load.

70. The apparatus of claim 68, wherein the impedances comprise a parallel arrangement of impedances that are selected in combination to provide the varying impedance.

71. The apparatus of claim 50, wherein the control circuit stores an overvoltage value representing a voltage value on the input power line above which the control circuit actuates a switch to isolate the electrical load from the input power line.

72. The apparatus of claim 50, wherein the control circuit stores an undervoltage value representing a voltage value on the input power line below which the control circuit actuates a switch to isolate the electrical load from the input power line.

73. The apparatus of claim 50, wherein the electrical load provides a load functioning signal indicating operation of the load, and wherein the control circuit is responsive to the load functioning signal to control operations of the power protection circuit.

74. The apparatus of claim 73, wherein load functioning signal corresponds to an indication that the load should not be interrupted, and wherein the control circuit is responsive to the load functioning signal to inhibit the power protection circuit from inserting an inrush current impedance and/or disconnecting the load from the input power line.

75. The apparatus of claim 73, wherein the load functioning signal varies in proportion to a percentage utilization factor corresponding to the load, and wherein the control circuit utilizes the percentage utilization factor to determine values of inrush current impedance.

76. The apparatus of claim 50, wherein the control circuit comprises a microprocessor coupled to receive the voltage measurement signals and the current measurement signals, and programmed to carry out the recited operative steps.

77. A method for selective protection of an electrical load from disturbances on an input power line in response to characteristics of the electrical load, comprising the steps of:
  (a) disconnecting the electrical load from the input power voltage in response to determination from voltage measurement signals of a disturbance comprising an overvoltage (OV) condition on the input power line as compared to a predetermined OV threshold;
  (b) as a function of current measurement signals and the relative time relationship between the disturbance and current drawn by the load during normal operation of the load, controlling a selectively variable inrush current limiting device to reduce inrush current resulting from the ending of a disturbance; and
  (c) reconnecting the load to the input power line through the inrush current limiting device in response to detection of the end of a disturbance.

78. The method of claim 77, wherein the relative time relationship between the disturbance and current drawn comprises an inrush current occurring prior in time to a voltage disturbance.

79. The method of claim 77, wherein the method is carried out in a machine comprising:
  a power protection circuit coupled to the input power line for providing electrical protection for the electrical load in response to control signals from a control circuit, the power protection circuit including an selectively variable inrush current limiting circuit and a switch for disconnecting the input power line from the load;
  a current measuring device coupled to the input power line for measuring current being provided through the power protection circuit to the electrical load and for providing current measurement signals;
  a voltage measuring device coupled to the input power line for measuring the voltage applied through the power protection circuit to the electrical load and for providing voltage measurement signals; and
  a control circuit coupled to the current measuring device and the voltage measuring device for receiving the voltage measurement signals and the current measurement signals.

80. The method of claim 77, further comprising the step of disconnecting the electrical load from the input power voltage in response to determination from the voltage measurement signals of a disturbance comprising an undervoltage (UV) condition on the input power line as compared to a predetermined UV threshold.

81. The method of claim 77, further comprising the step of disconnecting the electrical load from the input power voltage in response to determination from the voltage measurement signals of a disturbance comprising a voltage sag condition on the input power line.

82. The method of claim 77, further comprising the step of determining whether the electrical load is in an operative state in which disconnecting the load is to be inhibited.

83. The method of claim 82, further comprising the step of determining whether the load is in a first operative state or a second operative state as determined by an average of the current measurement signals over a predetermined period of time.

84. The method of claim 83, further comprising the step of adjusting the predetermined OV threshold in response to a determination that the electrical load is in a first operative state or a second operative state.

85. The method of claim 77, further comprising the step of controlling the inrush current limiting circuit as a function of the current measurement signals.

86. The method of claim 77, further comprising the steps of:
  (a) calculating a historical current usage parameter of the electrical load based on the current measurement signals over a predetermined time period during normal operation of the electrical load drawing current from the input power line;
  (b) based on the historical current usage parameter, setting a current threshold value corresponding to an expected current draw for the electrical load during a first state corresponding to normal operations;
  (c) determining, from the current measurement signals as compared to the current threshold that the electrical load is in a second state corresponding to a current draw exceeding that of normal operations;
  (d) determining from the voltage measurement signals at a predetermined point in time, the occurrence of a voltage disturbance experienced by the electrical load;
  (e) in response to a determination of the occurrence of a voltage disturbance at the predetermined point in time, determining, from the current measurement signals measured prior to the predetermined point in time, whether an inrush current to the electrical load occurred prior to occurrence of the voltage disturbance; and
  (f) in response to determination that an inrush current to the electrical load occurred prior to occurrence of the voltage disturbance, inhibiting the operation of the power protection circuit if the load is in the second state.

87. The method of claim 86, wherein the inhibiting the operation of the power protection circuit continues until the load returns to the normal state.

88. The method of claim 77, wherein the selective protection of the electrical load comprises one or more of the following: selective reduction of inrush current to the electrical load, selective disconnection of the input power voltage from the electrical load, selective connection of varied impedance values between the input power voltage and the electrical load, selective adjustment of electrical parameters used in determining selection of impedance values and/or disconnection of the electrical load, selective overriding of a protection function.

89. The method of claim 77, wherein the historical current usage parameter of the current measurement signals comprises a running average current value over a predetermined time period.

90. The apparatus of claim 77, wherein the running average is calculated over a predetermined time period selected from the group: a plurality of AC voltage cycles, a time period of milliseconds, a time period of second, a time period of minutes, a time period of hours.

91. The method of claim 77, wherein normal operation of the electrical load comprises a predetermined time period in which the electrical load is operating to draw the maximum current expected for full capacity of the load for its intended purpose.

92. The method of claim 91, wherein the electrical protection comprises an inrush current impedance coupled between the input power line and the load.

93. The method of claim 92, wherein the inrush current impedance comprises selectively insertable impedances that are switched into the circuit by a control circuit.

94. The method of claim 93, wherein the selectively insertable impedances comprise a parallel arrangement of thermistors connected in series with a switch that is actuated by the control circuit.

95. The method of claim 94, wherein the thermistors are negative temperature coefficient (NTC) devices.

96. The method of claim 92, wherein the inrush current impedance comprises a plurality of selectable impedances that are selectable by a control circuit to provide a varying impedance that increases inversely to the current drawn by the load.

97. The method of claim 96, wherein the impedances are selected so as to maintain a voltage level at the load that is within a predetermined nominal operating range for the load.

98. The method of claim 96, wherein the impedances comprise a parallel arrangement of impedances that are selected in combination to provide the varying impedance.

99. The method of claim 77, further comprising the step of actuating a switch to isolate the electrical load from the input power line in response to a measurement of the input voltage at an predetermined overvoltage value.

100. The method of claim 77, further comprising the step of actuating a switch to isolate the electrical load from the input power line in response to a measurement of the input voltage at an predetermined undervoltage value.

101. The method of claim 77, wherein the electrical load provides a load functioning signal indicating operation of the load, and further comprising the step of controlling operations of the power protection circuit in response to the load functioning signal.

102. The method of claim 101, wherein load functioning signal corresponds to an indication that the load should not be interrupted, and further comprising the step of inhibiting the power protection circuit from inserting an inrush current impedance and/or disconnecting the load from the input power line in response to the load functioning signal.

103. The method of claim 101, wherein the load functioning signal varies in proportion to a percentage utilization factor corresponding to the load, and wherein the control circuit utilizes the percentage utilization factor to determine values of inrush current impedance.

104. The method of claim 77, wherein the control circuit comprises a microprocessor coupled to receive the voltage measurement signals and the current measurement signals, and programmed to carry out the recited operative steps.

105. Apparatus for selective protection of an electrical load from disturbances on an input power line in response to characteristics of the electrical load, comprising:
  a voltage measurement circuit for monitoring the input power line;
  an adjustable protection circuit responsive to one or more detection parameters derived from the input power line for providing a plurality of selectable disturbance remediation types, at least one detection parameter comprising the input power voltage; and a circuit for adjusting a selected disturbance remediation type in response to a detection parameter, whereby nuisance trips and remediation of disturbances are controlled and adjusted based on said detection parameter.

106. The apparatus of claim 105, wherein the one or more a detection parameter includes one or more of the following: an overvoltage threshold value, an undervoltage threshold value, or a voltage sag threshold value.

107. The apparatus of claim 106, wherein the adjusting of the selected remediation type comprises adjusting one of said threshold values as function of a characteristic of the load.

108. The apparatus of claim 105, wherein the circuit for monitoring the input power line comprises a current measurement circuit, and wherein a detection parameter comprises the current drawn by the load.

109. The apparatus of claim 108, wherein the detection parameter comprises the average current drawn by the load during a predetermined measurement time period.

110. The apparatus of claim 105, wherein a selectable disturbance remediation type is selected from the group: disconnecting the input power line from the load, providing inrush current protection to the electrical load, providing selectively variable inrush current limiting to the load as a function of a detection parameter, controlling a sequence of disconnecting and connecting the input power line to the electrical load while controlling a selectively variable inrush current impedance value, inhibiting and/or overriding a disturbance remediation type.

111. The apparatus of claim 105, wherein adjusting a selected remediation type comprises providing a selectively variable inrush current impedance value.

112. The apparatus of claim 111, wherein the selectively variable inrush impedance value is provided by a parallel arrangement of selectable impedance devices.

113. The apparatus of claim 111, wherein the selectively variable inrush impedance value is provided by a temperature modulated impedance device.

114. A method for selective protection of an electrical load from disturbances on an input power line in response to characteristics of the electrical load, comprising the steps of:

monitoring the input power line and/or the electrical load by measuring the voltage at the input power line and/or the load to obtain one or more detection parameters, the detection parameters including but not limited to one or more of the following: the input power voltage, an overvoltage threshold value, an undervoltage threshold value, a voltage sag threshold value;

providing a plurality of selectable disturbance remediation types; and adjusting a selected disturbance remediation type in response to a detection parameter by adjusting one of said threshold values as a function of a characteristic of the load, whereby nuisance trips and remediation of disturbances are controlled and adjusted based on said detection parameter.

115. The method of claim 114, wherein the step of monitoring comprises measuring the current drawn by the load, and wherein a detection parameter comprises the current drawn by the load.

116. The method of claim 115, wherein the detection parameter comprises the average current drawn by the load during a predetermined measurement time period.

117. The method of claim 114, wherein a selectable disturbance remediation type is selected from the group: disconnecting the input power line from the load, providing inrush current protection to the electrical load, providing selectively variable inrush current limiting to the load as a function of a detection parameter, controlling a sequence of disconnecting and connecting the input power line to the electrical load while controlling a selectively variable inrush current impedance value, inhibiting and/or overriding a disturbance remediation type.

118. The method of claim 114, wherein adjusting a selected remediation type comprises providing a selectively variable inrush current impedance value.

119. The method of claim 118, wherein the selectively variable inrush impedance value is provided by a parallel arrangement of selectable impedance devices.

120. The method of claim 118, wherein the selectively variable inrush impedance value is provided by a temperature modulated impedance device.

* * * * *